US011947335B2

(12) United States Patent
Chen et al.

(10) Patent No.: US 11,947,335 B2
(45) Date of Patent: Apr. 2, 2024

(54) MULTI-COMPONENT STRUCTURE OPTIMIZATION FOR COMBINING 3-D PRINTED AND COMMERCIALLY AVAILABLE PARTS

(71) Applicant: Divergent Technologies, Inc., Los Angeles, CA (US)

(72) Inventors: Jinbo Chen, Rancho Palos Verdes, CA (US); Michael Morgan, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 60 days.

(21) Appl. No.: 17/522,690

(22) Filed: Nov. 9, 2021

(65) Prior Publication Data

US 2022/0206459 A1 Jun. 30, 2022

Related U.S. Application Data

(60) Provisional application No. 63/131,918, filed on Dec. 30, 2020.

(51) Int. Cl.
G05B 19/4099 (2006.01)
(52) U.S. Cl.
CPC ............ *G05B 19/4099* (2013.01); *G05B 2219/49023* (2013.01)
(58) Field of Classification Search
CPC ...... G05B 19/4099; G05B 2219/49023; G05B 2219/49016; G05B 2219/49017
See application file for complete search history.

(56) References Cited

U.S. PATENT DOCUMENTS 5,203,226 A 4/1993 Hongou et al.
5,742,385 A 4/1998 Champa
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

*Primary Examiner* — Thomas C Lee
*Assistant Examiner* — Tyler Dean Hedrick
(74) *Attorney, Agent, or Firm* — ARENTFOX SCHIFF LLP

(57) ABSTRACT

Aspects of methods, apparatuses, and computer-readable media for performing multi-material selection optimization (MMSO) to provide topologically and geometrically optimized multi-component structures (MCSs) across a plurality of design inputs and constraints are proposed. In some embodiments, a 3-D print model of an object based on load case criteria is obtained. A portion of the 3-D print model is determined that can be replaced with a commercial-off-the-shelf (COTS) part model such that the load case criteria remain satisfied. The portion or the 3-D print model can then be replaced with the COTS part model to determine the MCS model. In various embodiments, a mesh representation of the model can be generated, and plurality of optimization techniques can be used to determine the MCS model.

34 Claims, 12 Drawing Sheets

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |

(56) References Cited

U.S. PATENT DOCUMENTS

| | | |
|---|---|---|
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |

(56) References Cited

U.S. PATENT DOCUMENTS

| | | | |
|---|---|---|---|
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2004/0015866 A1 | 1/2004 | Estep et al. | |
| 2006/0108783 A1 | 5/2006 | Ni et al. | |
| 2008/0033654 A1 | 2/2008 | Bespalov et al. | |
| 2014/0277669 A1 | 9/2014 | Nardi et al. | |
| 2015/0057784 A1 | 2/2015 | Butler et al. | |
| 2015/0084953 A1 | 3/2015 | Luo et al. | |
| 2016/0067927 A1 | 3/2016 | Voris et al. | |
| 2017/0066198 A1* | 3/2017 | Ur | B33Y 50/02 |
| 2017/0113344 A1 | 4/2017 | Schönberg | |
| 2017/0341309 A1 | 11/2017 | Piepenbrock et al. | |
| 2021/0406417 A1* | 12/2021 | Hamada | G06F 16/90335 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Sassi, S. B., Jilani, L. L., Ghezala, H. H. B. (2003). COTS characterization model in a COTS-based development environment. Tenth Asia-Pacific Software Engineering Conference, 2003., 352-361. https://doi.org/10.1109/apsec.2003.1254389 (Year: 2003).*
Fisher, Z. C., Daniel Cooksey, K., Mavris, D. (2017). A model-based systems engineering approach to design automation of Suas. 2017 IEEE Aerospace Conference. https://doi.org/10.1109/aero.2017.7943597 (Year: 2017).*
International Search Report and the Written Opinion issued for corresponding International Application No. PCT/2021/058858, dated Feb. 8, 2022.
Zhang et al., "Open-Source 3D-Printable Optics Equipment", PLOS ONE, www.plosone.org, vol. 8, Issue 3, e59840, Mar. 2013, retrieved on Jan. 9, 2022.

* cited by examiner

MULTI-COMPONENT STRUCTURE OPTIMIZATION FOR COMBINING 3-D PRINTED AND COMMERCIALLY AVAILABLE PARTS

CROSS-REFERENCE TO RELATED APPLICATION

This application claims the benefit of, and right to priority to, U.S. Provisional Patent Application No. 63/131,918, filed on Dec. 30, 2020 and entitled "Multi-Component Structure Optimization for Combining 3-D Printed and Commercially Available Parts", the contents of which are incorporated by reference as if fully set forth herein.

BACKGROUND

Field

The present disclosure relates generally to design and manufacturing systems, and more particularly, to optimizing structures including additively-manufactured (AM) and commercial off-the-shelf (COTS) parts.

Introduction

AM systems, also described as three-dimensional (3-D) printers, can produce structures (referred to as build pieces) with geometrically complex shapes, including some shapes that are difficult or impossible to create by relying on conventional manufacturing processes such as machining, tooling, and extruding. COTS parts, by contrast, include standard parts with geometries and sizes more commonly found in manufacturing applications within a given industry (e.g., vehicles, aircraft, etc.). Thus, while AM parts can advantageously be printed with diverse geometries using specific alloys or materials having desired structural features, COTS parts can quickly be purchased at high volumes and comparatively low prices.

SUMMARY

The present disclosure is directed to optimizing multi-component structures (MCSs). As numerous technologies have rapidly evolved over the last few decades, the need to produce more complex and diverse structures has increased. MCSs can incorporate 3-D printed structure in places where complexity is needed, for example, and can incorporate COTS parts in places where simple structure is sufficient. In this way, MCSs can combine the advantages of 3-D printing (e.g., complex structures, design flexibility, etc.) with the advantages of COTS part (e.g., low cost, availability, etc.). In other words, MCSs can often leverage the benefits of both types of parts to create superior structures. Vehicles and other transportation-based structures may be particularly well-suited to take advantages of MCSs.

However, designing MCSs is fraught with guesswork. It is generally difficult to identify an optimal arrangement of COTS and 3-D printed parts in light of performance, cost, assembly, material requirements, and part durability factors, to name a few. While manufacturers' design choices may in many respects be intended to address the primary functional needs of the part, the design choices can in other respects be sub-optimal or even arbitrary, failing to take into account more subtle but equally important aspects of the design.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, a method for developing a multi-component structure (MCS) includes obtaining a 3-D print model of an object, wherein the 3-D print model is based on load case criteria, determining a portion of the 3-D print model that can be replaced with a commercial-off-the-shelf (COTS) part model, such that the load case criteria remain satisfied, and replacing the portion with the COTS part model to determine the MCS model.

As used herein, "COTS", "COTS parts", "COTS components" and the like can include parts that are not available commercially, but that generally have simpler shapes and structures than the more complex structures which may be 3-D printed. In this way, for example, COTS parts can be 3-D printed parts that have generally simpler shapes and structures typical of commercially available, non-3D printed parts.

In another aspect of the disclosure, a non-transitory computer readable medium has code stored therein for determining a multi-component structure (MCS) model. The code when executed by at least one processor causes the at least one processor to obtain a 3-D print model of an object, wherein the 3-D print model is based on load case criteria, determine a portion of the 3-D print model that can be replaced with a commercial-off-the-shelf (COTS) part model, such that the load case criteria remain satisfied, and replace the portion with the COTS part model to determine the MCS model.

In still another aspect of the disclosure, an apparatus for developing a multi-component structure (MCS) includes a 3-D print model module that obtains a 3-D print model of an object, wherein the 3-D print model is based on load case criteria, a model replacement determiner that determines a portion of the 3-D print model that can be replaced with a commercial-off-the-shelf (COTS) part model, such that the load case criteria remain satisfied, and a COTS replacement module that replaces the portion with the COTS part model to determine the MCS model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various aspects of multi-material selection optimization (MMSO) for determining MCS models will now be presented in the detailed description by way of example, and not by way of limitation, in the accompanying drawings, wherein.

DETAILED DESCRIPTION

Figure 1A:
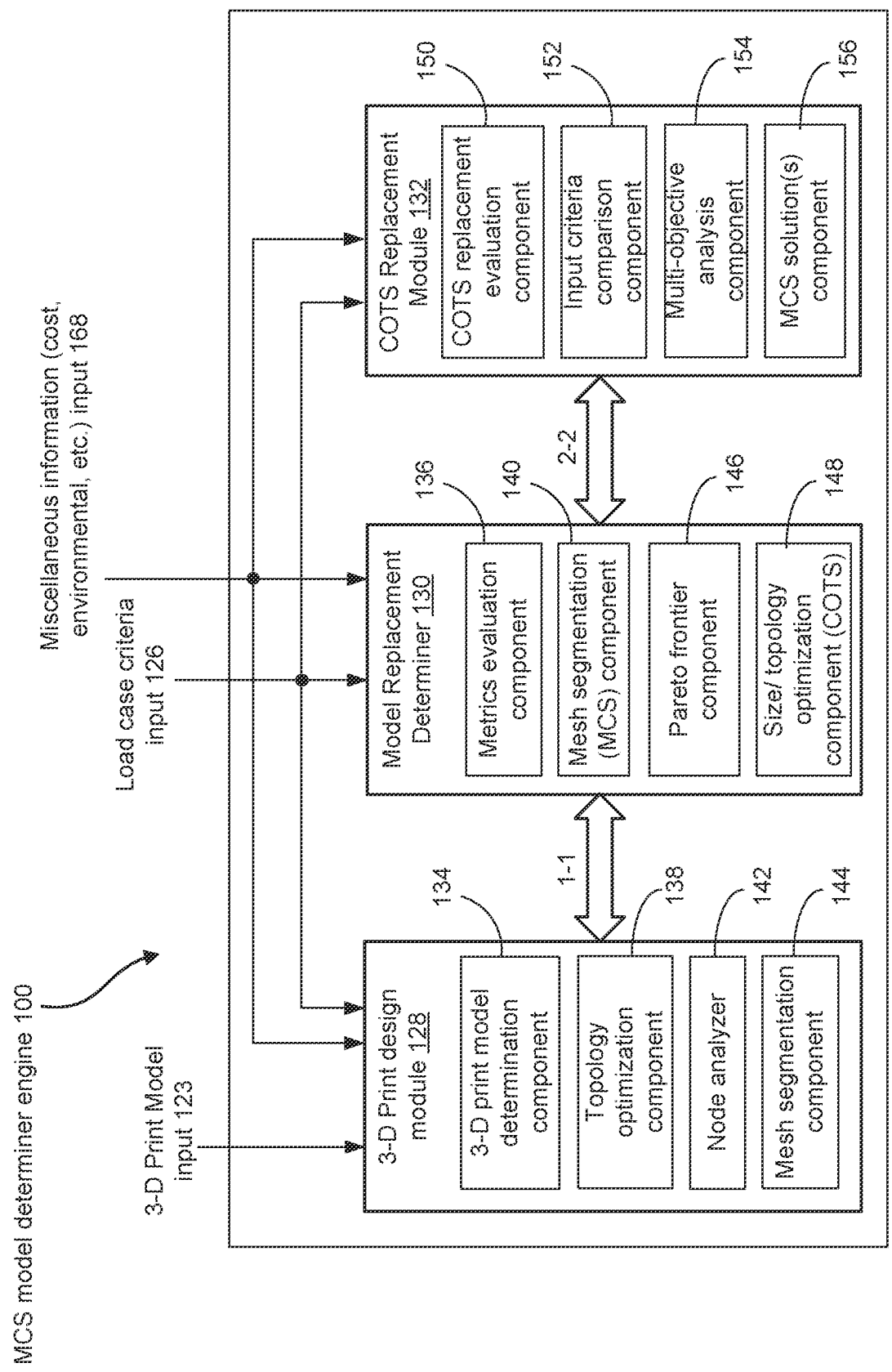
FIG. 1A is a block diagram of an exemplary MCS model determiner engine.

The detailed description set forth below in connection with the appended drawings is intended to provide a description of various exemplary embodiments of the concepts disclosed herein and is not intended to represent the only embodiments in which the disclosure may be practiced. The terms "exemplary" and "example" used in this disclosure mean "serving as an example, instance, or illustration," and should not necessarily be construed as excluding other possible arrangements or as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

The apparatus, methods and computer-readable media for determining MCS models in this disclosure will be described in the following detailed description and illustrated in the accompanying drawings by various elements such as blocks, components, circuits, processes, algorithms, etc. These elements may be implemented using electronic hardware, computer software, or any combination thereof.

By way of example, an element, or any portion of an element, or any combination of elements may be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The one or more processors may be part of a workstation or a server computer configured to perform the routines described herein. The one or more processors may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, object code source code, or otherwise.

Accordingly, in one or more example embodiments herein for obtaining or generating 3-D print models, determining COTS replacement part models, evaluating solutions, performing topology and multi-objective optimizations, performing geometry/mesh segmentations, determining MCS models, and performing other functions described herein, the functions may be implemented in hardware, software, or any combination thereof. If implemented in software, the functions may be stored on or encoded as one or more instructions or code on a computer-readable medium. Computer-readable media, as described below with reference to FIG. 10, includes computer storage media. Storage media may be any available information-storing media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. For purposes of this disclosure, the computer that may include the one or more processors may be directly or indirectly connected to a 3-D printer, such as a powder bed fusion-based printer.

This disclosure is directed to multi-component structure (MCS) model optimization apparatus, methods and computer-readable media for automatedly determining MCS models using multi-material selection optimization (MMSO) techniques to produce a combination of one or more COTS part models and one or more 3-D print models, potentially among other features. The term "multi-material" is broadly intended to refer to different materials (e.g., different on the macro-structural, micro-structural, molecular, or atomic level), different types of parts, different configurations of the same part, different part functions, different parts categories (e.g., COTS parts versus 3-D printed parts), and the like.

In various embodiments, exemplary objectives of MCS modeling techniques include using MMSO (1) to automatically identify different proposals for multi-material selection of COTS parts (such as, for example, plates, extrusions, pipes (cylinders), blocks, panels, or any other candidate COTS part) for incorporating within a composite part model including 3-D printed COTS part designs based on load case criteria and other input requirements, and (2) optionally, to evaluate and optimize the material selections across a number of cost factors, including, for example, print cost, assembly cost, and total life cycle cost. These objectives may in part be accomplished through the use of various modules that perform different functions.

Multi-Component Structure (MCS) Modeling

MCS modeling includes using input load case criteria for identifying one or more load cases as described herein. MCS modeling optimizes a structure in a design space using a combination of 3-D printed and COTS parts. In addition, a non-design space in some embodiments is generated. The non-design space is generally not optimized, and instead constitutes a hard point (e.g., a connector or a region designated to interface with a structure not being modeled). In various embodiments, the load case criteria, the design space, and the non-design space, potentially along with other input requirements, may be collectively considered as part of a baseline topology. The baseline topology may be identified in a partially or fully automated manner prior to the optimization. Mesh segmentation algorithms may be performed on the design space to identify geometric sections. After segmenting the model into geometric sections, various types of mesh-based modeling may be performed to create COTS mesh designs on the geometric sections in the design space. Various optimizations can be performed in the design space, including size and topology optimization. Additional 3-D parts to connect different COTS parts can also be designed and optimized.

After running the optimizations and comparing the simulated values against the load case criteria, MCS modeling then can use scoring algorithms to create a COTS proposal, which includes a design space with a 3-D printed representation of a structure, and a group of COTS part designs that can be used together. In some embodiments, the scoring algorithms may include performance, lifecycle analyses, and assembly cost to determine whether the MCS model with the COTS grouping is workable. The MCS proposal includes a CAD model, illustrations of the model, specifications of the COTS parts, and numerical values pertaining to various criteria such as force vectors on the model, stresses, material rigidity, and other characteristics of interest.

In some embodiments, the MCS model procedure may create a group of different proposals. Scoring algorithms and further validation based on the load case criteria may be performed. The best proposal of the group of proposals may be determined based on the score of the computed values versus input values of the various parameters, as well as further design validations, if necessary.

FIG. 1A is a block diagram of an exemplary MCS model determiner engine 100 according to various embodiments. The engine 100 in this embodiment includes three exemplary modules 128, 130 and 132 that each include various functional components. The engine 100 may be arranged in whole or in part on an integrated circuit, or as part of dedicated hardware. The engine 100 may be included or distributed on one or more general or special purpose processors, or on a personal computer, workstation, server, or other electronic device. In some cases, the identified functions in engine 100 may be performed across a distributed network or collection of two or more computing devices. The engine 100 may be implemented as various combinations of hardware, firmware, or code stored on a computer-readable medium.

While a logical overview of certain key components is illustrated, FIG. 1A is not intended to include an exhaustive presentation of all such components. The identity and order of the components and modules shown in FIG. 1A are for illustrative purposes, and numerous other arrangements may be adopted that remain within the scope of the disclosure. The functional components within the modules may also be organized in different ways, and are not intended to be limited to the configuration of the identified modules. Moreover, the functions described with reference to one module may in other embodiments be performed on any of the other modules. While three modules in the engine 100 are illustrated for clarity, another number of modules is possible.

3-D print design module 128 can be used to determine or otherwise obtain a 3-D print model of one or more structures based on load case criteria. The load case criteria can be provided to the various modules of MCS model determiner engine 100 via load case criteria input 126. As described in greater detail herein, a load case may include a set of loads, supports, and displacement constraints that act on a model at a given time. Load case criteria may include a number of different specifications and items of information (as described below) that are relevant to determining the geometry, structure, and material composition of the MCS model. The load case criteria on which the MCS model (including the 3-D print model) is based may also be provided to module 128.

The 3-D print model, or information relevant to determining the print model, may in some embodiments be provided as 3-D print model input 123 to MCS model determiner engine 100. The 3-D print model input 123, which may include 3-D print model information, can be routed to 3-D print design module 128. 3-D print design module 128 is responsible in the embodiment shown for determining the 3-D print model to be used as part of the MCS model. (While the 3-D print model is often used in the singular form herein, in various embodiments the MCS model may include multiple models corresponding to different structure designs within the overall MCS model.) The 3-D print model may represent a computer-aided design (CAD) rendering of the portion of the MCS model to be 3-D printed. The 3-D print model can subsequently be compiled by software into specific print instructions that can be interpreted by a 3-D printer. Exemplary such 3-D printers include powder bed fusion (PBF) printers for 3-D printing metallic or metal-alloy structures. PBF printers may include several variants, such as selective laser sintering (SLS), selective laser melting (SLM), electron beam melting (EBM), multi jet fusion (MJF), etc. Other types of 3-D print technology (e.g., direct metal deposition (DMD) for 3-D printing without needing a powder bed, fused deposition modeling (FDM) for printing plastic components, and the like) may also fall within the scope of this disclosure. In some embodiments, the 3-D print model may take on forms other than a CAD model.

In one aspect of the disclosure, one or more processors (sometimes generally referred to as a "processing system") are adapted to determine the 3-D print model in an automated manner based on the load case criteria. The 3-D print model determination component 134 of the 3-D print design module 128 may use the load case criteria input to coordinate development of the 3-D print model, drawing assistance where necessary from other components of 3-D print design module 128. For example, the 3-D print model determination component 134 may use the load case criteria provided at load case criteria input 126 to establish the material, structural, and geometric foundations of the print model components. The 3-D print model determination component 134 may oversee the running of different processes in the proper sequence including topology optimization from topology optimization component 138, node analysis from node analyzer 142, and mesh segmentation from mesh segmentation component 144 to refine and develop the foundation into a working model composed of mesh representations that make the model accessible for other operations. The specific functions of topology optimization component 138, node analyzer 142 and mesh segmentation 144 are discussed in greater detail below.

In some cases, the 3-D print model development may be configured to be partially automated, to accord some control over the model's development to a designer. In these cases, MCS model determiner engine 100 may be connected to user interface devices such as a keyboard, mouse, monitor, etc. With these interfaces, 3-D print design module 128 can prompt a user to enter data that enables the user to provide some degree of control over the development of the 3-D print module and to refine the model as necessary.

In embodiments where the 3-D print model is obtained from another source by 3-D print design module 128, load case information from load case criteria input 126 may be used for validation purposes, such as to confirm that the obtained 3-D print model complies with the load case criteria. Where modifications are necessary to the obtained print model, the 3-D print model determination component 134 can make changes to the model. The edits can be fully automated, or in the case of partial automation, a user can be prompted to provide input data.

In various embodiments, 3-D print design module 128 may be configured to use information in addition to load case criteria for determining the 3-D print model. This information, such as cost information, may be provided along with the load case criteria at input 126, or in some embodiments it may be provided at miscellaneous information input 168. In addition, in various embodiments, the 3-D print model may be segmented using mesh segmentation component 144 into a mesh representation having constituent mesh components. In some embodiments, mesh segmentation may additionally, or instead, be performed in connection with the model replacement determiner 130 or the COTS replacement module 132.

Having obtained an optimized 3-D print model, the model may be provided on an automated basis via data line 1-1 to model replacement determiner 130. Model replacement determiner 130 is a module that can be used to automatedly identify one or more portions of the 3-D print model that can be replaced with a commercial-off-the-shelf (COTS) part model, such that the load case criteria remain satisfied. In some embodiments, model replacement determiner 130 may be used to identify candidate COTS parts for potentially incorporating into portions of the 3-D model, and for identifying the best candidates based on the load case criteria, available geometries, design requirements, and other information (e.g., cost considerations, environmental considerations, etc.). In some embodiments, model replacement determiner 130 may also be used to identify any smaller 3-D printed parts that should be co-printed or otherwise separately provided for inclusion with the 3-D printed model.

In some embodiments described further below, model replacement determiner 130 includes a metrics evaluation component 136 for evaluating relevant metrics against different design requirements. In this example, the design requirements against which the metrics can be evaluated may include specific load case criteria from input 126, or from miscellaneous information input 168. In some embodiments, the model replacement determiner 130 can use components 140, 146 and 148 to perform automated analyses that may convert the 3-D print design model into a multi-component structure (MCS) model.

For example, model replacement determiner 130 can use metrics evaluation component 136 to evaluate those characteristics of multi-component designs that can permit incorporation of other known structures into the 3-D print model. To help achieve this objective, model replacement determiner 130 may include a mesh segmentation (MCS) component 140. MCS component 140 may segment the 3-D printed model, or an optimized version of the 3-D printed model, into mesh representations for further analysis. In embodiments where mesh segmentation component 144 of 3-D print design module 128 already performed an earlier segmentation of the 3-D printed model, then mesh segmentation (MCS) component 140 may update the mesh representation as needed, e.g., to refine shapes based on input load case criteria, to accommodate regions for placement of COTS parts, and the like. In other cases, mesh segmentation component 144 may not be used. Mesh segmentation (MCS) component 140 and mesh segmentation component 144 may be separate components (or software modules) in practice, or they may be integrated into a single module for performing mesh segmentation procedures in MCS model determiner engine 100 where needed.

Mesh segmentation generally segments larger geometrical volumes into manageable constituent parts that can potentially correspond to known COTS parts, as an example. Mesh segmentation can include, for example, partitioning the material layout of the MCS model into multiple mesh segments that can potentially be represented as individual COTS parts, as described further below with reference to FIG. 1B. Different objects may be evaluated to determine whether any known or accessible COTS parts (e.g., maintained in a library maintained in MCS model determiner engine 100) may be suitable replacement candidates for the evaluated object. The replacements are tagged or identified. In various embodiments, a valid replacement part should not only be a geometrical match for the evaluated portion, but the part should also possess, or be modified to possess, the physical features and material characteristics that are necessary for that portion of the 3-D model. Exemplary physical features and properties may include load case criteria such as size, physical dimensions, material type, flexibility, density, stiffness, rigidity, conductivity, connectivity (e.g., whether the COTS part can properly connect with the 3-D printed portion), maximum loads, expected lifetime, and potentially many others.

To optimize some or all of these factors, model replacement determiner 130 may use component 148 to run size or topology optimization on potential replacement COTS part models. In addition, topology optimization may be run on some combination of the 3-D printed portion and the potential COTS portion of the model. In some embodiments, topology optimization component 138 and size/topology optimization component (COTS) 148 may be separate modules. In other embodiments, they may parts of the same component. Size/topology optimization component (COTS) 148 may allow model replacement determiner 130 to identify the various load paths that may be exerted on the COTS part, and other properties, in view of the input load case criteria. Using this information, the topology optimization can identify an optimized material layout of the structure. Topology optimization can either be used on the MCS model as a whole, or on individual regions and portions of the structure, or it can be used in both contexts. Size/topology optimization component (COTS) 148 can use topology optimization to both find the proper types of parts, and to optimize the size, shape and other properties of the part to comport with the load case criteria. Model replacement determiner 130 can use this type of information to determine the optimal COTS parts for use in the relevant portion of the MCS structure model. In some embodiments, size or topology optimizations may also be run or rerun on different portions of the MCS structures with the COTS parts incorporated therein. From these types of analyses, both the identity of the COTS structures and the optimal size, shape, and features of the combined MCS may be identified. In some embodiments, only the COTS part models are optimized at this stage. Model replacement determiner 130 can accordingly determine portions of the 3-D print model that can be replaced with COTS parts that, in turn, are consistent with the load case criteria.

In some cases, the model replacement determiner 130 may find more than one potential solution, or even a group of solutions. Model replacement determiner 130 may use a pareto frontier component 146 to determine where the proposed solutions lie along a pareto frontier. A pareto frontier includes a set of parameters that are pareto efficient.

Pareto efficiency corresponds to a set of parameters that have some maximum level of efficiency such that any change that is made to the value of one of the parameters in the set degrades another parameter. The pareto frontier component 146 can assist the model replacement determiner 130 in finding the best solution in view of the load case criteria and other considerations.

The findings from model replacement determiner 130, including the mesh-represented, topologically optimized and pareto optimized 3-D print and COTS models, may thereafter be provided over data line 2-2 to COTS replacement module 132. COTS replacement module 132 may replace the portions of the 3-D print model with the corresponding identified COTS parts models to determine the MCS model.

COTS replacement module 132 may be optionally equipped with various features for optimizing the part. For example, COTS replacement module 132 may include COTS replacement evaluation component 150, input criteria comparison component 152, multi-objective analysis component 154, and MCS solution(s) component 156.

The COTS replacement evaluation component 150 may enable COTS replacement module 132 to determine a plurality of different potential replacements based on the information provided from the model replacement determiner 130. For example, in some embodiments, COTS replacement evaluation component 150 may consolidate the information from model replacement determiner 130 and convert the information to a format compatible for use by a particular 3-D printer. The consolidated information may also include the portions of the 3-D print model previously analyzed and the corresponding potential COTS parts model (s) to be used within the specified portions. In some embodiments, the COTS replacement evaluation component 150 can provide a multi-tiered set of solutions compatible with the input load case criteria. For example, the solutions may include:

1. An identified portion, or region, of the 3-D print model, and different candidate COTS parts models that can be positioned within or otherwise connected to the portion or region in a specified way using an identified geometry (e.g., a 3-D coordinate system including coordinates that define the geometry).
2. COTS parts that can be positioned within the specified portion of the 3-D print model (also using a coordinate grid to identify the values)
3. Identified smaller co-printed 3-D printed parts to be used in the vicinity of the specified portion These three categories of information may be used to yield multiple different solutions for the MCS structure. COTS replacement module 132 can provide this information to the manufacturer in a useable form. For instance, the MCS structure can be provided as a compiled set of print instructions, or a consolidated CAD print model with all refinements made to ultimately accommodate the COTS parts.

COTS replacement module 132 may also include an input criteria evaluation component 152. Input criteria evaluation component 152 compares potential COTS replacements based on one or more input criteria. In some embodiments, potential replacements can be compared based on the load case criteria. Input criteria evaluation component 152 may output a single, optimal MCS model, integrated to include the selected COTS parts, the latter of which may be distributed throughout the various portions of the structure. The output may also include a list of optimized features and specifications that identify aspects of the MCS model such as its dimensions, overall load characteristics, material composition(s), and other important features. The output may also include one or more executable files, including a revised 3-D print model. This information can be provided to the manufacturer.

COTS replacement module 132 may further include multi-objective analysis component 154, in which further refinements can be made to the existing model. A multi-objective problem may include a mathematical problem which attempts to optimize a plurality of objective functions simultaneously to produce an optimal solution. In various embodiments, the objective functions that may be considered include one or more of maximizing structural performance, minimizing a number of 3-D printed parts, and minimizing a number of joints. While it may be the case that some of the functions cannot be optimized simultaneously, the multi-objective analysis can beneficially further narrow the number of optimal solutions.

COTS replacement module 132 may further include MCS solution(s) component 156. The MCS solution(s) component generally evaluates the generated designs to produce the final set of solutions. Thus, the MCS solution(s) component 156 may produce an up-to-date list of candidate solutions, potentially ordering the solutions based on their measure of adherence to the load case criteria. In various embodiments, the same portion of the 3-D model may include different prospective COTS parts models. The manufacturer can select one of the optimized solutions, or alternatively, the solutions can be input into the MCS model determiner engine 100 to find a single solution, if possible, that is a "best fit" based on the physical requirements of the load case criteria, and the other considerations such as cost, availability of parts, environmental factors, and the like. Using this information, the MCS solution(s) component 156 can exclude any solutions not falling within the desired categories. Where the manufacturer has requested a single solution, it may be the MCS solution(s) component 156 in certain embodiments that makes the final exclusions to identify a single solution.

In other embodiments, the MCS solution(s) component 156 is used to produce the final MCS model in the format desired by the user. The format of the MCS model may be such that it is viewable and editable on a computer screen via a computer aided design (CAD) program or other program. The MCS model may also include files that may be compiled and used directly by a compatible 3-D printer. Where the MCS model can be automatedly assembled, the MCS model may include different files corresponding to instructions for COTS positioning, mechanical connections, welding requirements, adhesive requirements, or other bonding information relating to coupling the 3-D printed structure of the model with the COTS parts.

Where the final solution calls for the COTS parts to be retrieved, in some embodiments, the MCS model determiner engine 100 may be electronically linked to the manufacturer's inventory system via the MCS solution(s) component 156, to enable the component 156 to communicate the parts needed for the optimized MCS structure. If the COTS parts need to be purchased, the MCS model determiner engine 100 may also be linked to the purchasing department. In some embodiments, the parts required may need to be 3-D printed, extruded, or machined—that is, the parts need to be custom parts—in which case the MCS solution(s) component 156 can provide this information. MCS model determiner engine 100 may additionally be linked to one or more 3-D printers to enable a printer to render the MCS structure.

In some embodiments, the MCS solution(s) component 156 may specify that support structures are needed. This information can be conveyed along with the other output information.

Figure 1B:
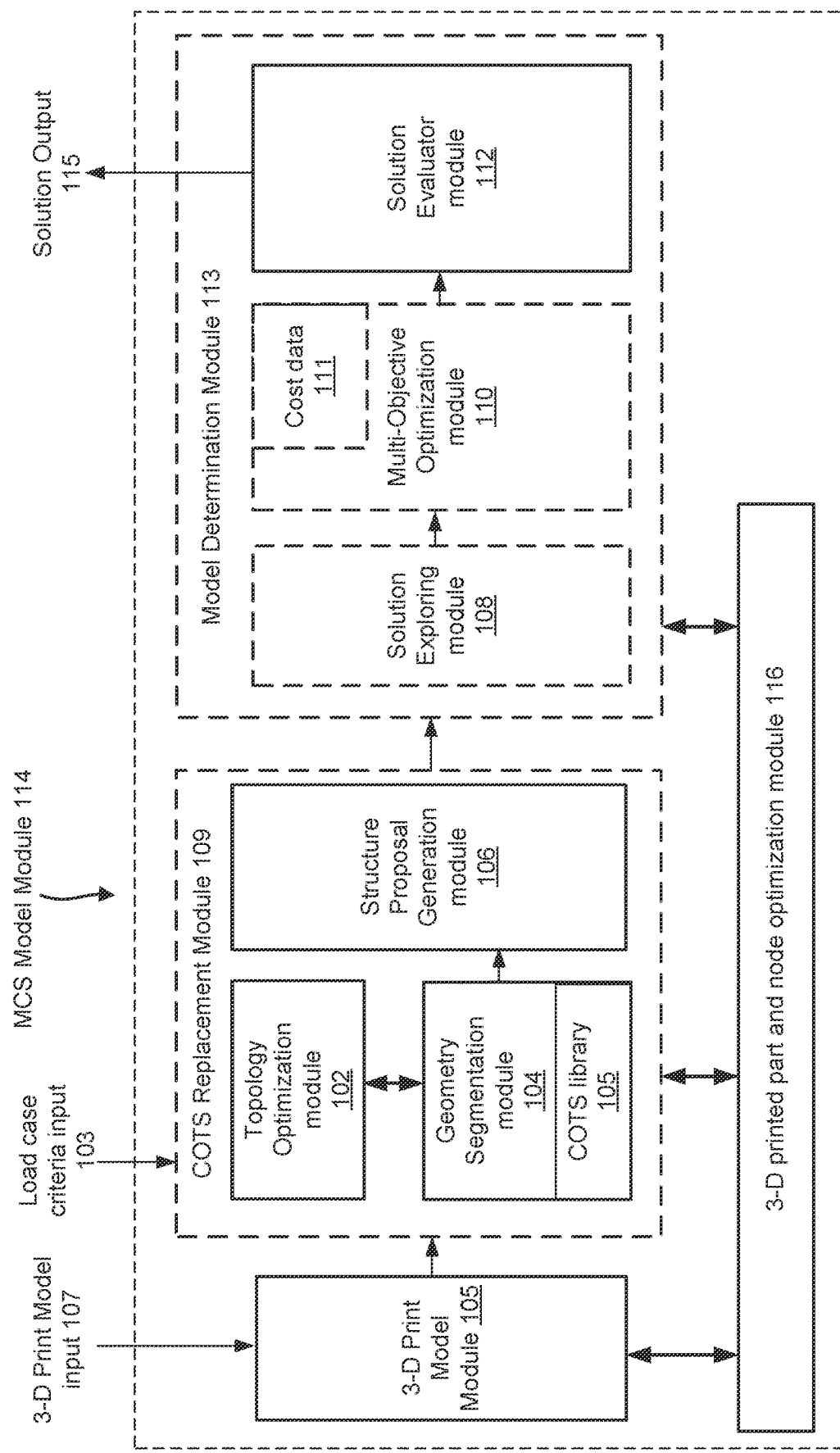
FIG. 1B is a block diagram of an MCS model module for producing optimized MCS models.

FIG. 1B is a block diagram of an MCS model module 114 for producing optimized MCS models. FIG. 1B illustrates additional embodiments and features of an exemplary MCS optimization system. It will be appreciated by those skilled in the art that many of the components or concepts discussed with reference to FIG. 1B can be substituted for use in the embodiments of FIG. 1A, and vice versa.

Like in FIG. 1A, the MCS model module 114 shown in FIG. 1B may be implemented using general purpose hardware, dedicated hardware, firmware, software, or a combination thereof of one or more processing devices. MCS model module 114 includes a plurality of subcomponent modules such as 3-D print model module 105, COTS replacement module 109, model determination module 113, and 3-D printed part and node optimization module 116. The sequence shown by the arrows in FIG. 1B is exemplary in nature, and the order of functions performed by the submodules in MCS model module 114 may be rearranged into other sequences to accommodate additional embodiments without departing from the disclosure.

As shown in FIG. 1B, 3-D print model input 107 may be provided to a 3-D print model module 105. The 3-D print model module 105 may use the input criteria to determine the 3-D print model. In some arrangements, the 3-D print model that is input to module 105 may be the model itself. In other arrangements, the 3-D print model module 105 may use its processing resources to determine the 3-D print model. In these embodiments, the 3-D print model input 107 includes a set of criteria defining requirements for the model. The 3-D print model module 105 may computationally prepare an initial 3-D print model of the structure based on these included criteria. The MCS model module 114 may in some cases be arranged on a computing device such as a workstation, server, or PC. The 3-D print model in some embodiments may be prepared at least in part by a user, using ordinary interface hardware (keyboard, mouse, display, external drive, etc.) of the computing device. In some cases, the user can prepare the model as a CAD model. Where the model generation procedure is automated, the 3-D print model can be iteratively generated such that a set of approximate solutions can be generated before converging on a final solution that most closely satisfies the input constraints.

The 3-D print model module 105 may be coupled to COTS replacement module 109. COTS replacement module includes components for refining and modifying the 3-D print model within a design space, identifying portions of the model that can be replaced with less expensive COTS parts, identifying portions of the model that may need to be augmented with co-printed parts or other non-COTS components, and proposing a plurality of MCS structures with candidate COTS parts.

In one embodiment, 3-D print model module 105 provides the 3-D print model to topology optimization module 102. The load case criteria input 103 may provide load case criteria and other information (e.g., lifecycle data, cost information, COTS count requirements, hard point location data, size and shape requirements, weight restrictions, etc.) to the topology optimization module 102. The topology optimization module 102 may use this information and criteria, together with the 3-D print model from 3-D print model module 105, to identify the structural and material layout of the MCS model. More generally, topology optimization uses mathematical techniques to optimize material layout within a given design space for a set of input loads and boundary conditions.

The design space may refer to a volumetric region identified for performing the optimization. In an embodiment, the MCS structure can attain any shape within the design space that maximizes performance. In accordance with one method, topology optimization may use input criteria to determine a load path. The load path includes information defining the magnitudes and directions of maximum stress on the MCS structure in response to an applied load. From this information, the method can determine a model of an optimal structure (or portion of the structure under consideration). Topology optimization can advantageously be automated in the embodiments herein. In one embodiment, the topology optimization method used is a finite element method (FEM), although other methods are possible.

As noted above, the design space of an MCS structure may represent the boundary in which each of the optimizations take place. The design space may thus circumscribe the boundary of the MCS structure. Where the structure is optimized to be smaller than the design space, the structure may be modeled with additional 3-D printed connectors sized to enable the structures to connect to other structures that may be positioned adjacent to the design space.

In some embodiments, topology optimization module 102 is further configured to run size optimization, potentially using minimum and maximum sizes as well as the design space information provided with the load case criteria. The size optimization algorithms may be different from those of topology optimization.

The topology optimization data may be provided to the geometry segmentation module 104. The geometry segmentation module may include COTS library 105, a library of COTS parts. In various embodiments, the MCS model module 114 may use geometry segmentation to identify the potential COTS parts to be used in the structure. Geometry segmentation in one configuration refers to partitioning the material layout of a design space into multiple segments (e.g., using meshes, pixels, etc.) with the goal of changing the representation of abstract segments into meaningful parts. These meaningful parts may include COTS parts stored in COTS library 105. Mesh segmentation is one such geometry segmentation technique, in which meshes are used to represent the modeled structure. In some embodiment, mesh segmentation is used to produce surface meshes in the 3-D print model. Using the surface meshes in different portions of the 3-D print model, appropriate COTS parts can be identified as candidates to replace the portions of the model.

In various embodiments, the segments produced can be volume meshes. Because the volume mesh can include a polygonal representation of the interior volume of an object as well as the object's surface, volume meshes can beneficially discretize the entire object. Candidate replacement COTS parts can be identified to correspond to different portions of the volume meshes.

In other embodiments, in lieu of a dedicated COTS library 105, models of the COTS parts can be provided as external inputs at load case criteria input 103 or another input to COTS replacement module 109. In various embodiments, a combination of topology optimization and geometry segmentation can be exploited to identify a combination of candidate replacement COTS parts for use in the MCS model.

As is evident from FIG. 1B, both topology optimization module 102 and geometry segmentation module 104 are connected to 3-D printed part and node optimization module 116. One exemplary function of 3-D printed part and node optimization module 116 is to identify additional 3-D printed structures that may be needed to fully implement the design. In various embodiments, these additional 3-D printed structures may act as connector designs, custom adapters for incompatible parts, fluid or wire carrying mechanisms, load-bearing structures, and the like. Module 116 may generate models for additional 3-D printed parts having features that cannot be practically implemented using COTS parts but that are nonetheless required for the solution. The 3-D printed part may not correspond to an available COTS part because it may be geometrically unique, for example.

In various embodiments, 3-D printed part and node optimization module 116 may be used to produce node designs (described below) connecting the different COTS parts below. To this end, COTS replacement module 109 (e.g., via topology optimization module 102) may combine a set of identified COTS replacement part designs with additional 3-D printed part models procured from 3-D printed part and node optimization module 116 and, using this information, COTS replacement module 109 may run size and topology optimization on the combined parts to optimize the size, position, geometry and other features of the 3-D printed structures and nodes procured by 3-D printed part and node optimization module 116. For example, 3-D printed part and node optimization module 116 may also use topology optimization module 102 and geometry segmentation 104 to perform size and topology optimization and mesh segmentation on the 3-D printed parts. In some cases, the optimization may be performed not merely on individual parts, but on combinations of 3-D printed parts and replacement COTS parts. Running optimizations on the combined parts may help ensure that the additional 3-D printed models fit perfectly between the COTS parts within the relevant portion of the design space and include the features required by the load case criteria.

In other embodiments, the optimization of the 3-D parts and node may be performed in connection with the structure proposal generation module 106, below. In still other embodiments, the generation of the replacement COTS parts and the additional 3-D printed parts may all be performed concurrently based on a single module. Yet other embodiments will produce the COTS and 3-D printed part designs in sequence, with one set of part designs being produced before the other. The process may run optimization routines one or more times on the individual parts, a combination of the parts, or both. The optimization routines may in some embodiments be performed sequentially in different portions of the MCS model. In each of these cases, the result is a set of COTS parts that are properly positioned within the MCS model, that are correctly aligned with corresponding 3-D printed structures such as nodes and joints, and that meet the load case criteria.

Referring still to FIG. 1B, a geometrically segmented model of the MCS structure along with the identified COTS part models may be provided to structure proposal generation module 106. Structure proposal generation module 106 may be configured to produce a plurality of structural proposals and to send the proposals to model determination module 113. A structural proposal in structure proposal generation module 106 includes both the COTS parts and the 3-D part(s) integrated together to form an MCS solution that adheres with the input requirements. In some embodiments, several alternative proposals may be prepared and sent to model determination module 113. Generating structure proposals may include identifying potential solutions that most accurately represent the composite geometry of the MCS structure, and that most accurately and efficiently perform the identified functions of the MCS structure. A proposal can be made, for example, by providing the optimized MCS model together with the identification and proposed location of the COTS replacement parts procured through prior steps including topology optimization module 102 and geometry segmentation module 104. In various embodiments, structure proposal generation module 106 may be constrained to preserve only potential solutions for which parts can be manufactured that satisfy the load case criteria and design requirements provided at load case criteria input 103 with some predetermined degree of precision or accuracy. MCS models that cannot meet this threshold may be discarded at this stage.

In various embodiments, structure proposal generation module 106 may determine that additional structure is required to (i) make a model a viable MCS solution, (ii) enhance the efficiency of an existing MCS solution, or (iii) propose a new solution with unique advantages. In these cases, structure proposal generation module 106 may request 3-D printed part and node optimization module 116 to generate one or more part designs needed for the new proposal. The part designs requested may, for example, be additional 3-D printed parts. In some embodiments, the parts requested may be non-COTS parts that are machined, extruded, or made using a conventional manufacturing process. 3-D printed part and node optimization module 116 may identify these part designs, and send appropriate proposals back to structure proposal generation module 106. In some embodiments, 3-D printed part and node optimization module 116 may separately run optimizations to identify these types of parts while structure proposal generation module 106 evaluates other structures.

In the exemplary embodiments above, 3-D printed part and node optimization module 116 performs tasks upon the request of structure proposal generation module 106. As shown by the multiple arrows in FIG. 1B, however, the functions of 3-D printed part and node optimization module 116 may be performed at any stage of the process. In some embodiments, 3-D printed part and node optimization module 116 may use the topology optimization and geometry segmentation functions described with respect to topology optimization module 102 and geometry segmentation module 104, respectively, to procure the additional designs for the MCS model. Data corresponding to these designs may be consolidated in the form of a plurality of proposed MCS models at structure proposal generation module 106.

In various embodiments, a bidirectional connection is established between 3-D printed part and node optimization module 116, topology optimization module 102, geometry segmentation module 104, structure proposal generation module 106 and solution exploring module 108 to enable the modules to coordinate operations when performing optimizations and when developing candidate geometries.

In some embodiments, 3-D printed part and node optimization module 116 may receive load case criteria input 103 directly to identify portions of the structure where 3-D printed parts or connectors between COTS parts are necessary. 3-D printed part and node optimization module 116 may subsequently use information from topology optimization module 102, geometry segmentation module 104, structure proposal generation module 106 and solution exploring module 108 to identify multiple sets of candidate 3-D printed part designs, with each set being associated with a separately optimized MCS model associated with its own replacement COTS part designs. Thus, the different proposed MCS models identified by COTS replacement module 109 can be determined taking into account the 3-D printed part designs that are determined to be associated with each solution, and the properties, geometries, and materials anticipated for use in each 3-D part.

3-D printed part and node optimization module 116 may produce nodes for connecting the COTS parts. A node is a structure (e.g., within a vehicle or other mechanical assembly) that may incorporate custom interfaces to connect together other components. For example, a node may act as an interconnect between tubes, extrusions, panels, other nodes, etc. Using 3-D printing, a node having any necessary geometry may be constructed to include additional features and functions, depending on the objectives. For example, a node may be printed with one or more ports that enable the node to secure two parts by injecting an adhesive rather than welding multiple parts together, as is traditionally done in manufacturing complex products. Nodes may also be constructed to route fluids or electrical wiring or circuitry between different locations of the vehicle. Nodes may be intelligent, and may incorporate processing elements and in some cases, motors or other sophisticated equipment to perform tasks. A major advantage of nodes is that they can be 3-D printed using essentially any arbitrary shape or geometry that may be needed for use within the design to be optimized. Another advantage is that, depending on the 3-D technology, nodes may be 3-D printed using a metallic alloy or substance that includes allows the node to have very specific properties consistent with different load case criteria. For example, nodes may designed to support heavy loads, or to have a specific rigidity or density. In various embodiments, after potential replacement COTS parts have been positioned in connection with different proposals, 3-D printed part and node optimization module 116 can be used to design 3-D printed nodes having shapes needed to integrated all the COTS part designs and to add, where necessary, additional features to complete the MCS model.

3-D printed designs such as nodes can be modeled using CAD-based algorithms. Thus, in some embodiments, 3-D printed part and node optimization module 116 may be coupled or integrated with a CAD or other rendering suite to enable on-the-fly modeling of nodes and other 3-D printed structures. In some embodiments, the load case input 103 may provide node designs that provide an initial framework for producing MCS models that incorporate multiple 3-D printed structures that interface with different COTS parts in the design space. In still other embodiments, 3-D printed part and node optimization module 116 may be configured to include a library of 3-D print models of nodes that can be refined and reshaped as necessary to provide solutions for different models.

The proposed MCS models may thereupon be sent to model determination module 113. Model determination module 113 may be used to evaluate the different models provided by structure proposal generation module 106 to identify a final solution that will be manufactured. While different modules (e.g., solution exploring module 108, multi-objective optimization module 110, and solution evaluator module 112) are shown to illustrate various embodiments, one or more of these modules may be omitted without departing from the scope of the disclosure.

In solution exploring, a combination of different structure proposals from structure proposal generation module 106, each using different types, locations, and orientations of COTS and 3-D printed parts, constitutes a solution space. The different combinations using solution exploring module can be further evaluated to ensure that the solution space is sufficiently sampled. If the solution space is not sufficiently sampled, then the proposals identified may be insufficient to ensure that an optimal solution closest to meeting the load case criteria has been designed. Thus, in one embodiment, the solution exploring module 108 runs an algorithm to ensure that the structure proposals adequately represent, and sufficiently take into account, all the criteria that have been identified as necessary to optimize. For example, if all of the MCS models in the solution space meet an identified maximum allowed weight only by a small margin, structure proposal generation module 106 may determine that the prior optimizations did not sufficiently take into account part combinations in which maximum weight was optimized. In this case, solution exploring module 108 may provide feedback to the COTS replacement module 109 with directions to run additional optimizations to find combinations of parts that better optimize total weight. This example can be extended in other embodiments to any of the criteria and input requirements.

In an embodiment, the creation of COTS proposals may be made using scoring algorithms. Scoring algorithms allow for the use of mathematical/statistical methods to determine most likely scenarios numerically. For example, scoring can be based on factors like product cost, assembly cost, performance, lifecycle analysis, and the like, to determine that the group of COTS selected will successfully function together to meet a representative group of criteria. Exemplary criteria may be that the structure based on the MCS model should last over longer time periods and in the vicinity of potentially high temperatures, etc.

Once the solution exploring module 108 determines that a cross-section of prospective solutions is sufficiently representative of the properly weighted input criteria, the module may optionally pass the solutions set to a multi-objective optimization module 110. During multi-objective optimization, the different proposed structures may be considered across multiple objective functions. As the name suggests, multi-objective optimization may attempt mathematically to optimize more than one function simultaneously. For example, the prospective solutions may be evaluated across different cost inputs simultaneously, including 3-D print cost, part assembly cost, and total lifecycle cost. For purposes of this example, regularly-updated cost data may be included in a database or memory 111 for ease of access. Multi-objective optimization module 110 may evaluate the solutions in a manner which attempts to optimize minimize 3-D print cost (e.g., by reducing total amount of print material) while also minimizing lifecycle cost (e.g., by making the structure durable to extend its lifetime). Any number of optimizations may be performed depending on the relative importance of the load case criteria and other input requirements.

The model determination module 113 may also include a solution evaluator module 112 to select the solutions provided from module 110 across a pareto frontier and present the recommended solutions and their key performance metrics to users via solution output 115.

In this manner, the users can consider the different optimal solutions and the trade-offs that may have been necessary to achieve them. The manufacturer may select the MCS model identified for that solution, e.g., a structure for use within an aircraft.

The techniques for optimizing the solutions are exemplary in nature. In some embodiments, one or more of the optimization techniques may be excluded. In other embodiments, the optimization techniques may be performed in a different order, or simultaneously. Further, while the modules in FIGS. 1A and 1B illustrate exemplary techniques for identifying and optimizing an MCS model, additional or different techniques may be used.

Load Case Criteria and Design Inputs.

Different categories of inputs may be considered for use in determining an MCS model. The inputs may also take several forms depending on the configuration. For example, the inputs may include one or more CAD files prepared by a user. The inputs may also include numerical values specified by the user and other files whose format is compatible with and recognized by the processing system or software in use. The load case criteria may also be in the form of third party information—e.g., COTS specifications from the provider of the relevant COTS parts. The input may additionally be in the form of updates, particularly for uploading to databases that maintain records for purposes of the methods described herein. These databases may store information pertaining to COTS parts, system information, costs, regulations (e.g., wireless transmission limits, safety regulations, etc.), and other relevant systems or information databases.

Figure 2:
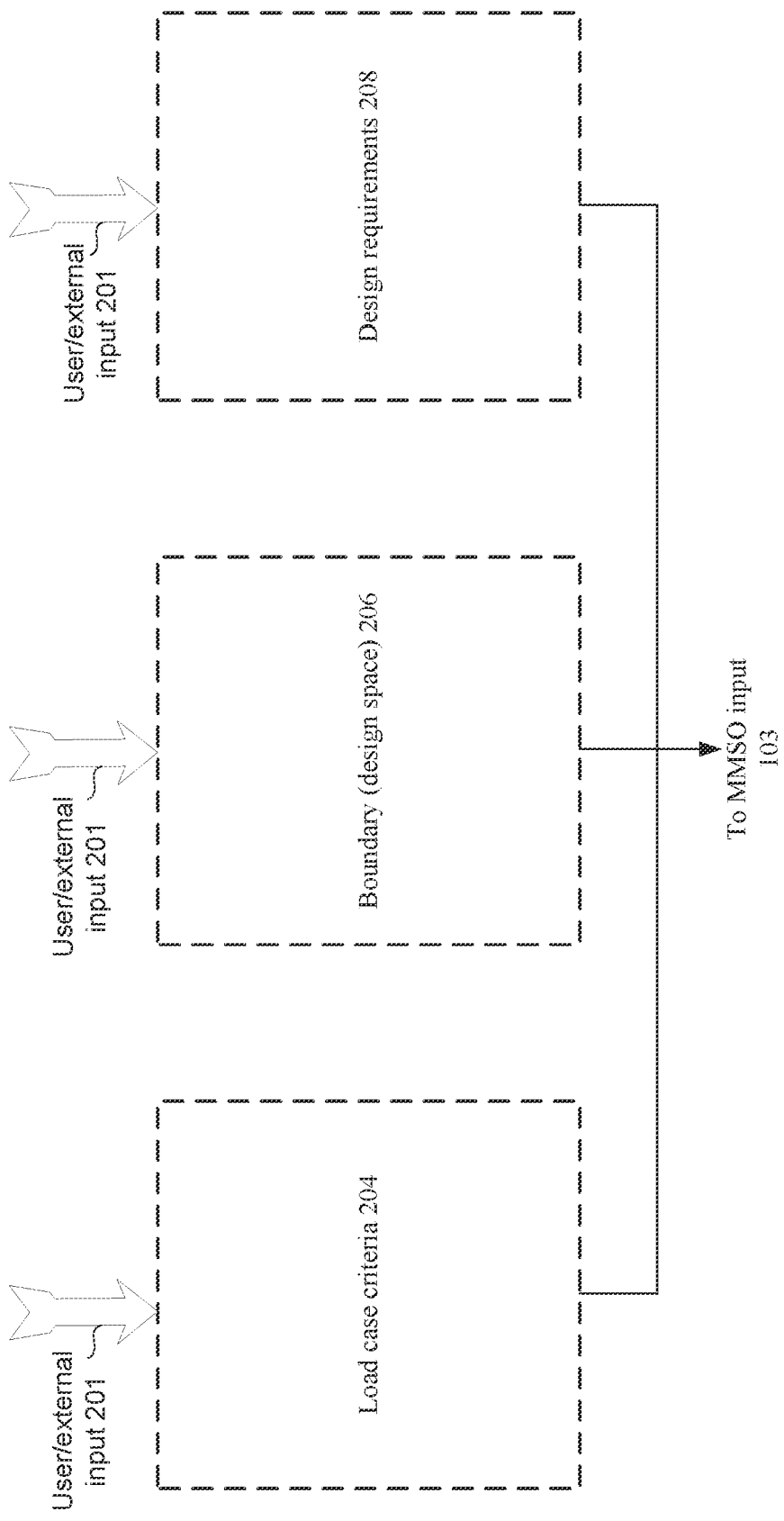
FIG. 2 is a conceptual diagram illustrating exemplary inputs used in MCS modeling.

FIG. 2 is a conceptual diagram illustrating exemplary inputs used in the MCS model development. Referring to FIG. 2, the user/external input 201 may include load case criteria 204, a boundary (design space) 206, and design requirements 208. As noted above, the load case represents the loads that act on a model. In one embodiment, the load cases criteria 204 may include any criteria relevant to these loads. In another embodiment, load case criteria 204 may include a collection of specifications with respect to which topology optimization produces a mapping of mesh elements to element density for the structure. Different element densities across a model, for example, can represent regions of the model that are subject to different loads, with larger densities potentially indicative of regions subjected to heavier loads. Different load case criteria may be used to specify different types of MCS models. For example, the initial topology optimization may generate a structure with a surface or volume mesh. The load case criteria can identify the predicted distribution of different loads on the structure defined by the MCS model when the structure is operational, e.g., when inserted into an operational aircraft, vehicle, or other assembly. The mesh elements may be further partitioned into elements having different densities, to account for the differences in load distribution across the part. In a similar configuration, load cases may include vector quantities representing magnitudes and direction of predicted forces on the structure. In some cases, the loads may be static; in others, the loads may change over time and therefore may function as a range of loads.

The user/external input 201 may also include a boundary (design space) 206 of a structure. The boundary may be a volume mesh that describes the total space that bounds the feasibility region. The feasibility region may represent the set of all points of an optimization that satisfies the input requirements and constraints of the design. The boundary roughly represents the maximum possible geometrical shape of the structure, including all of its constituent COTS and 3-D printed parts. In some embodiments, the boundary input may include a non-design space. In other embodiments, the boundary does not include a non-design space; rather, the non-design space may border or otherwise be fitted adjacent the boundary. Non-design spaces may include regions in the model that cannot be modified during the optimization. Non-design spaces may include, for example, the presence of adjacent components in a larger design, the contacts or connection points used to connect to other components, or regions that require space. The non-design space helps to ensure that the optimization takes place within the design space or boundary, and not anywhere in the non-design space.

Another input includes the design requirements 208. The design requirements 208 encompass a set of hard (necessary) requirements and software design requirements and constraints across which the optimization is performed. For example, the design requirements 208 may specify that the total cost (including 3-D print, cost, part cost, and assembly cost) shall not exceed a specified amount. The design requirements may include different requirements for different types of MCS models. One example is a project that sets a high environment-related or "eco" score even if it results in a heavier part. Both the design requirements 208 and the boundary requirements may overlap with load case criteria 204. Some exemplary considerations for design requirements 208 include:

Life cycle cost and the environmental impact of manufacturing. Life cycle cost is the sum of all recurring and one-time costs over the full life span or over a specified period of an MCS. In an embodiment, the life cycle cost may be competing with the manufacturing impact of the MCS.

Cost, including cost of both the COTS parts and an estimate of the 3D print costs to be incurred.

Size requirements, including minimum or maximum sizes or shapes for COTS parts—(sometimes these are hard requirements, meaning requirements that must be met and cannot be traded off against other requirements)

Weight restrictions (generally also hard requirements)

COTS part count, maximizing or minimizing the number of COTS parts used for an MCS.

Material requirements (e.g., material compositions)

3-D printing capabilities and limitations, print resolution and material, print capacity Initial specifications and requirements for 3-D printed parts Specifications describing larger structure(s) of which smaller structure being optimized is a part or is adjacent and shares loads MCS Design Process.

While the MCS process may vary according to different embodiments, various embodiments contemplate determining optimal solutions for structures used in any type of mechanized transport assembly—e.g., from any type of vehicle to aircraft, watercraft, spacecraft, etc. The MCS structures benefit optimally from a combined availability of COTS parts, 3-D printed parts, and in some embodiments, custom parts using conventional manufacturing. The MCS structure models may in some case incorporate panels that are custom made through techniques like molding, vacuum bagging, saturating materials in a fluid, and materials heated to high temperatures.

Figure 3A:
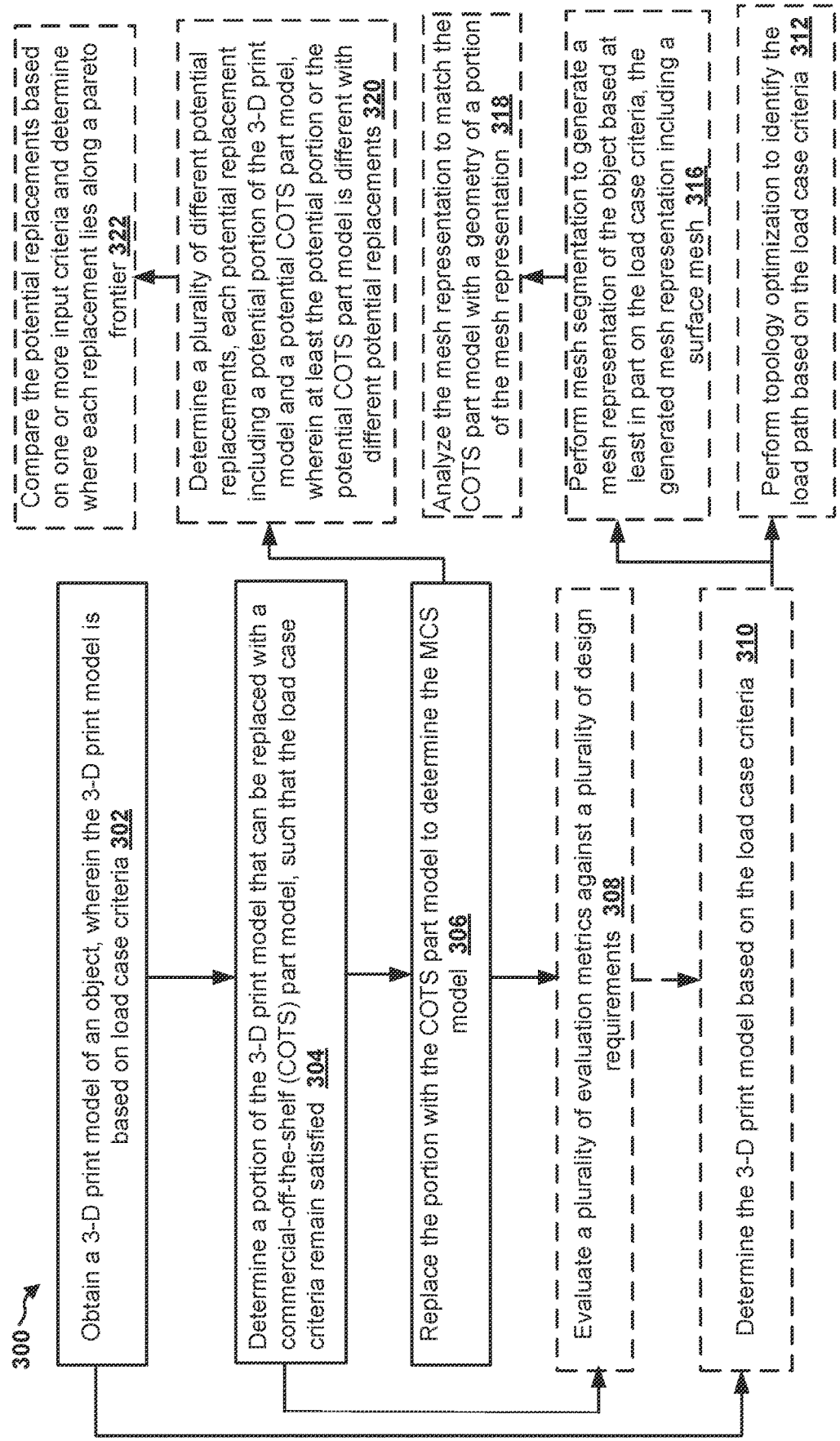
FIG. 3A is an exemplary flowchart illustrating a method of MCS optimization.

FIG. 3A is an exemplary flowchart illustrating a method of MCS optimization. The steps in FIG. 3B may be performed by the structures in FIG. 1A, 1B and FIG. 10 using any of the configurations described herein. The rectangular boxes with the dashed lines indicate optional steps. At 302, the MCS optimizing structure may obtain a 3-D print model of an object, wherein the 3-D print model is based on load case criteria. The load case criteria may include any of the criteria described in this disclosure, and other criteria related to the loads or intended loads on the structure described by the MCS model. At 304, the MCS structure may determine a portion of the 3-D print model that can be replaced with a commercial-off-the-shelf (COTS) part model, such that the load case remains satisfied. At 306, the MCS structure may replace the portion with the COTS parts model to determine the MCS model. The MCS structure may make any number of replacements of these portions of the 3-D model with COTS parts models. Additionally, 3-D printed parts such as a node and other components may be identified for incorporation within the MCS model.

At 308, the determining step of 304 may further include evaluating a plurality of evaluation metrics against a plurality of design requirements. These design requirements may include load case criteria and other input criteria, as described for example with reference to FIG. 2. At 310, the step of obtaining the 3-D print model may include determining the 3-D print model based on the load case criteria. Determining the print model may include, for example, automatedly generating the 3-D print model using the load case criteria. The determination of the print model may be partially automated in some embodiments, wherein a user is able to provide input or edits to the system via a computer or other processing device.

At 312, the determining step may further include performing topology optimization to identify the load path based on the load case criteria. In addition, at 316, the determining step may further include performing mesh segmentation to generate a mesh representation of the object based at least in part on the load case criteria, wherein the generated mesh representation includes a surface mesh. In other embodiments described herein, the generated mesh may include a volume mesh. At 318, the MCS structure may analyze the mesh representation to match the COTS parts model with a geometry of a portion of the mesh representation. One or more COTS parts models may be identified as a replacement for this purpose. At step 320, the replacement step in 306 may further include determining a plurality of different potential replacements, each potential replacement including a potential portion of the 3-D print model and a potential COTS part model, wherein at least the potential portion or the potential COTS part model is different with different potential replacements. Thus, different COTS parts designs may be distributed as a plurality of potential replacements across the MCS model. At 322, the MCS model may compare the potential replacements based on one or more input criteria and determine where each replacement lies along a pareto frontier.

Figure 3B:
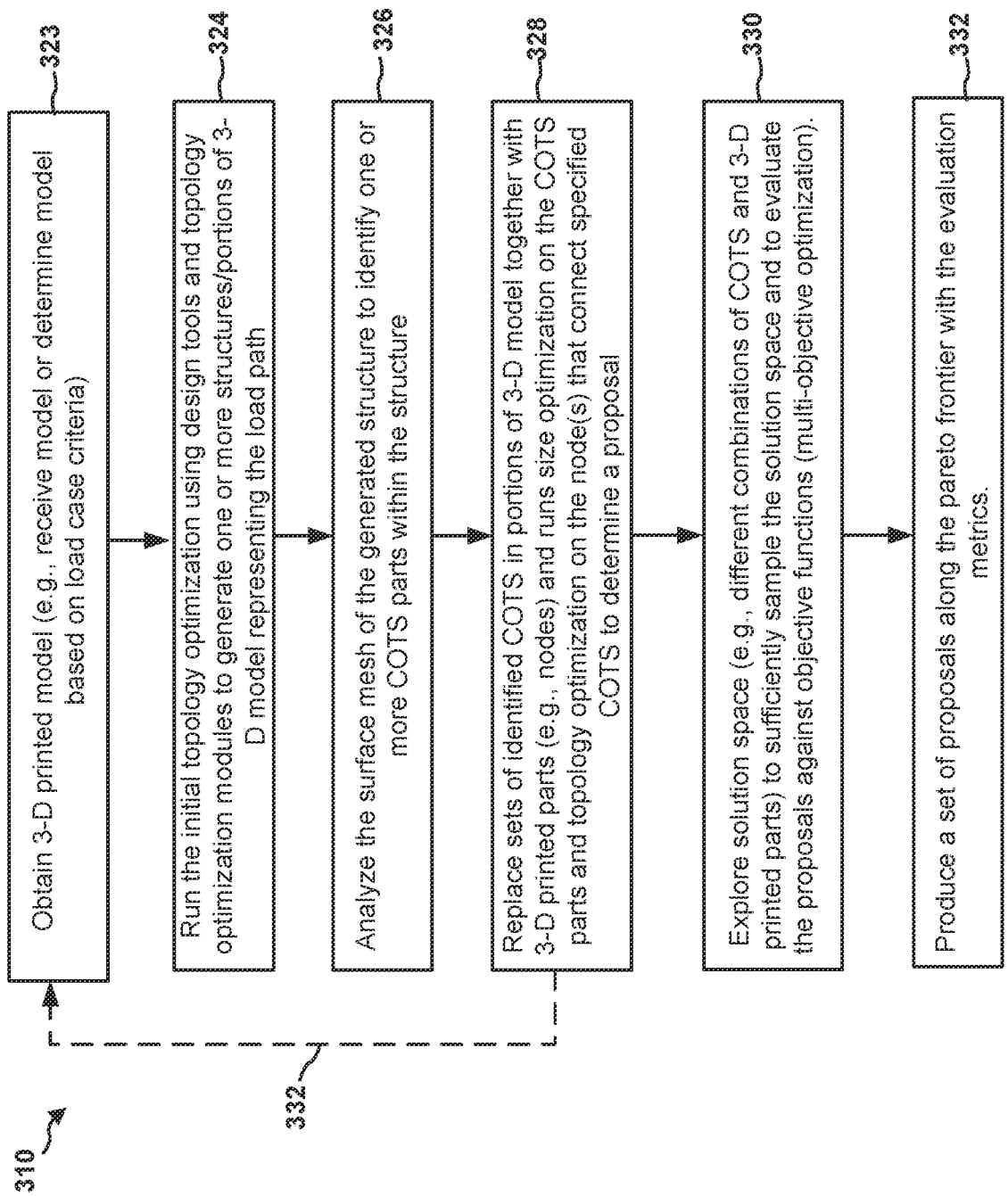
FIG. 3B is an exemplary flowchart illustrating a method of MCS optimization.

FIG. 3B is an exemplary flowchart illustrating a method of MCS optimization. The steps in FIG. 3 may be performed, for example, by one or more of the modules in MCS model determiner engine 100 of FIG. 1A, by the apparatus of FIG. 1B, or by the apparatus of FIG. 10. At 323, the MCS optimizer may obtain a 3-D print model of an initial structure. The 3-D print model may be received, for example, or it may be determined through analysis and processing using load case criteria and other design inputs.

At 324, the MCS optimization solution may run the topology optimization (e.g., using the topology optimization module 102 of FIG. 1B) using the load case criteria and the 3-D print model, to generate structures, or portions of the 3-D model, representing the load path. The load path may identify for example the loads vectors and stresses for different portions of the MCS structure being modelled. In some embodiments, topology optimization enables the MCS optimizer to generate structures, or portions within the 3-D model, having a baseline topology defined by shape and mesh contours.

At 326, the MCS optimizer may analyze the surface mesh of the generated structures or portions to identify one or more COTS parts within the structure or portion of the structure. In some embodiments, the generated COTS parts designs may use different mesh elements to account for the initial shape and/or the calculated load paths on the structure. The load case criteria input upon which the structures are based may also include geometrical criteria like a boundary or a design space. For example, different portions of the design space may have different densities, as identified by the generated meshes, to account for different loads at those portions of the design space. As the optimization proceeds, the MCS model can generate or optimize structures that are within the identified boundary.

For example, at 328, the MCS optimizer may combine sets of identified COTS parts designs in portions of the 3-D print model together with 3-D printed parts such as nodes and, in this example, the optimizer may run size optimization on the COTS parts and topology optimization on the nodes that connect the specified COTS parts to determine a proposal that is consistent with the load case criteria and input requirements. The proposal may represent a potential solution. In various embodiments, the MCS optimizer may produce a pool of solutions, and then select the solution from that pool that most closely represents the input specifications. In these embodiments, it is often important to ensure than a sufficiently representative pool of solutions are proposed.

The process steps may take place in different orders in various embodiments. For example topology optimization of the nodes may take place concurrently with step 324. In the embodiments of FIG. 3B, the COTS part designs may first be generated using topology optimization, and thereafter, the 3-D printed part designs needed to connect the COTS parts together may be formed using separate optimizations. In this manner, the COTS part designs can first be generated and optimized. Thereafter, interconnects (e.g., nodes, joints, fasteners, etc.) can be designed to connect the COTS parts together consistent with the load case criteria. In various embodiments, 3-D printed part designs may be modeled that perform additional functions beyond acting as interconnects.

In some embodiments, the above steps in FIG. 3A or 3B may be performed a number of times to produce a corresponding number of potential solutions. At 330, the topology optimizer can explore the solution space (e.g., different combinations of COTS and one or more 3-D printed part models) to ensure that the solution space has been sufficiently populated and to evaluate the solutions/proposals against one or more objective functions using multi-objective optimization.

Figure 4:
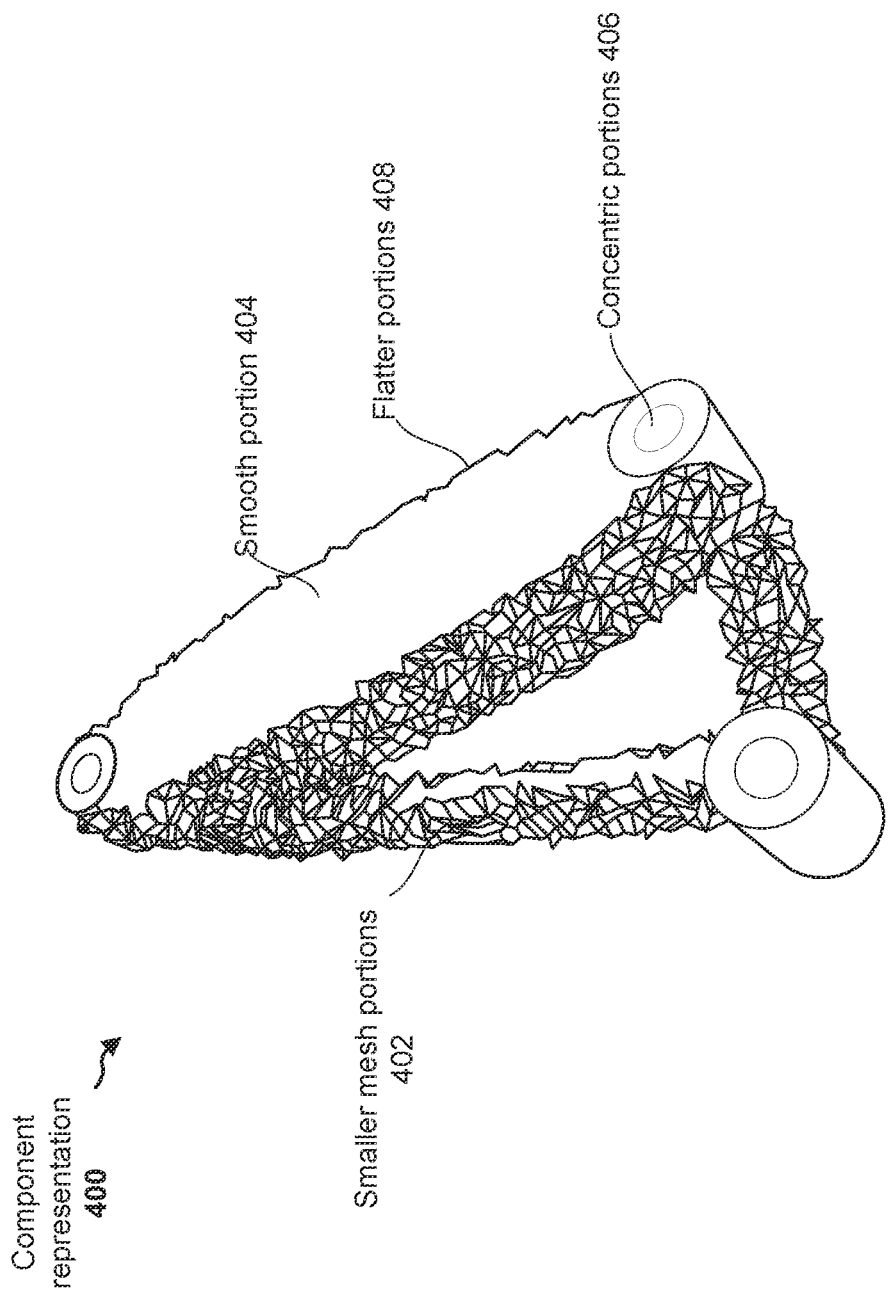
FIG. 4 illustrates a structural component representing a load path generated using topology optimization based on load case criteria.

FIG. 4 illustrates a structural component 400 representing a load path generated using topology optimization based on load case criteria. Component representation 400 may, for example, include a 3-D printed model. The mesh-segmented component 400 has certain smaller mesh portions 402, along with a smooth portion 404 that is representative of the load path. As shown in this representation, features of the 3-D printed model begin to become differentiated as the MCS optimization performs operations. Based on the differentiated geometrical features of component 400, the use of COTS parts may be geometrically favorable. For example, COTS parts may be less expensive and much faster to procure (especially in bulk) than a structure which is only a 3-D printed structure. The cost of print material is also reduced when COTS parts are incorporated into the design.

Figure 5:
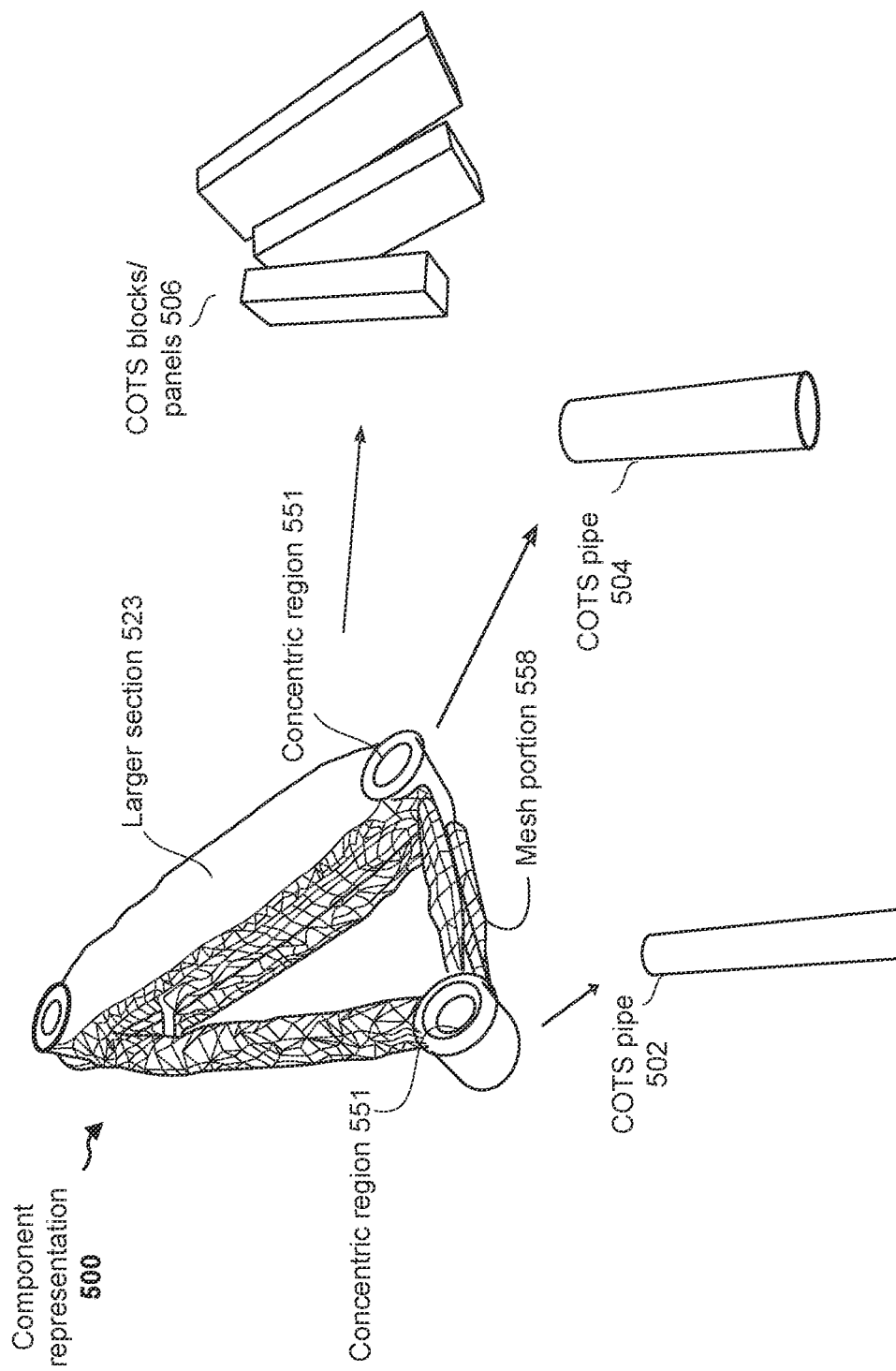
FIG. 5 shows a component-level surface mesh analysis of the structure of FIG. 4 for identifying individual candidate COTS parts in the component.

FIG. 5 shows a component-level surface mesh analysis of the component 500 from FIG. 4, as described in step 326 of FIG. 3B, for identifying individual candidate COTS parts in the component. In the example shown, the structure may be part of a vehicle, such as an automobile. The mesh analysis of step 304 may be carried out using only COTS parts that will fit within the design space identified, and that will conform to the load case criteria. In some embodiments, scoring algorithms may be performed on candidate COTS parts designs to ensure that the selected designs are compatible with each other and would function properly over a sufficient lifecycle.

Referring still to FIG. 5, the surface mesh analysis performed by the MCS optimizer has identified three candidate COTS parts designs which may be considered blocks or panel sections 506 for use in the larger section 523 of the component 500. For example, the three identified structures 506 may be standard COTS part designs that can be aligned together to form part of larger section 523. The structures 506 can be chosen to meet the load case criteria using appropriate materials given the application and expected lifecycle. In some embodiments, the MCS optimizer may also introduce a machining process in which the edges of panels 506 can be contoured to more closely match their required boundaries.

In addition, the surface mesh analysis in FIG. 5 reveals the concentric regions 551 which may be ideal for incorporating appropriately-sized COTS cylindrical pipe designs 502 and 504. It should be noted that the example of component 500 is used to preserve simplicity to avoid unduly obscuring the concepts of the disclosure. In other embodiments, a large number of COTS parts and groups thereof may be identified. In addition, in many arrangements, much larger and more geometrically-intensive 3-D print models may be procured, along with complex node models and other non-COTS structures.

After different designs such as identified in FIG. 5 are completed and provided as part of a proposal, the proposal may be evaluated along with similar proposals to determine a potential solution.

In some cases, the design may involve a larger structure having a potentially large number of constituent components. The MCS optimization may combine a set of individually identified COTS part designs. The individual COTS part designs are connected with 3-D printed parts using one or more optimization techniques described herein. The MCS optimizer may then run size optimization on the COTS parts designs, and topology optimization on the 3-D printed parts (e.g., nodes) that connect the COTS parts. The optimization process selects geometries and features that ensure that the model proposal will meet the original load cases and the design space. Only valid MCS model proposals will be added to the proposal pool for further evaluation.

Figure 6:
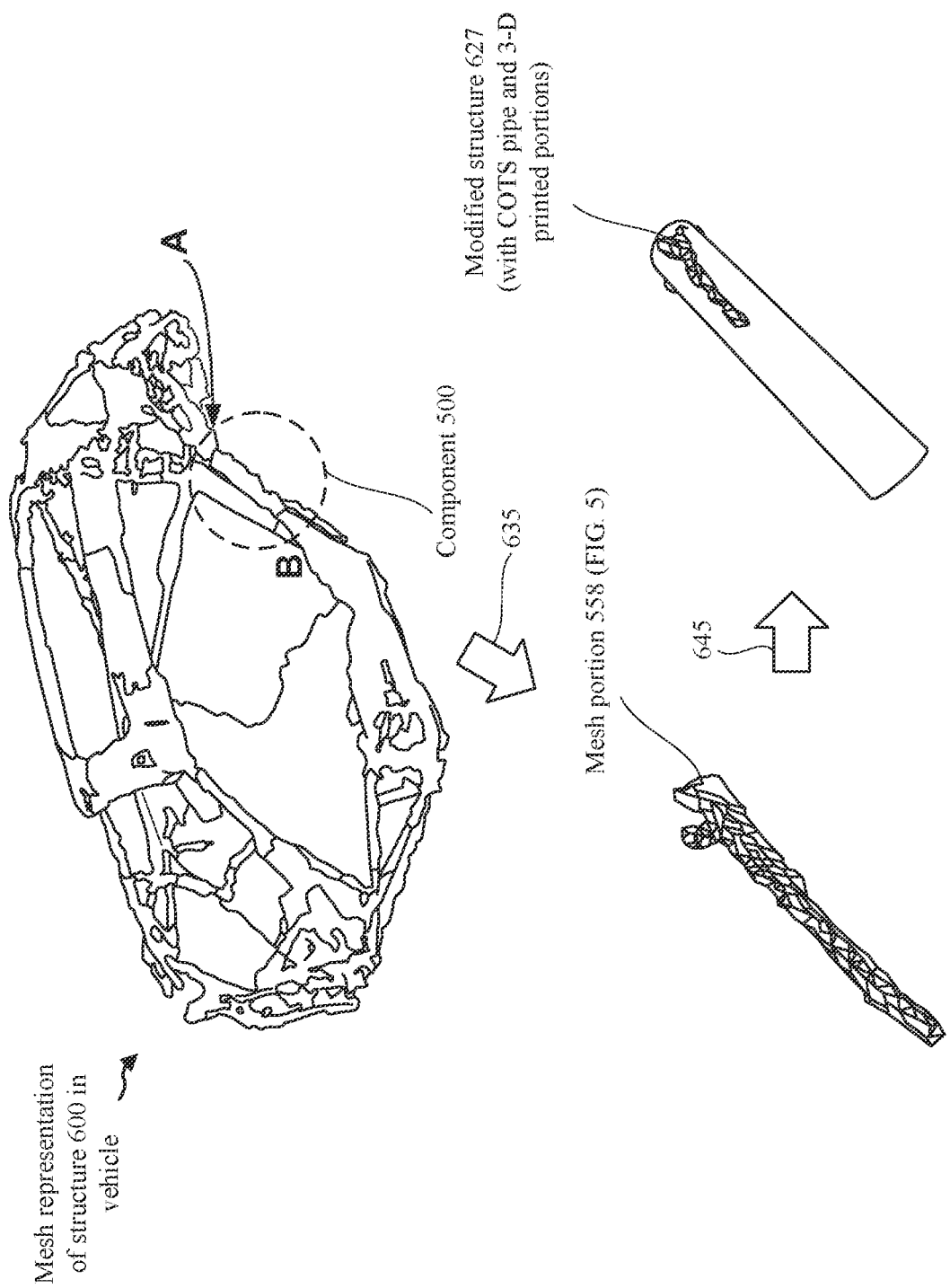
FIG. 6 illustrates a representation of a larger vehicular structure including the structure model of FIG. 5.

FIG. 6 illustrates a representation of a larger vehicular structure 600 including the structure model 500 for which COTS parts designs were identified in FIGS. 4 and 5. The representation of the larger structure 600 may be used in a vehicle-level analysis in which different proposals for the same structure, e.g., a vehicle chassis, are compared. In an exemplary embodiment of the vehicle-level mesh analysis in FIG. 6, the MCS optimizer may have modeled component 500 to be part of the larger representation of structure 600. The MCS optimizer may identify mesh portion 558 as a part of the modeled component 500 from FIG. 5 (see arrow 635). The MCS optimizer may evaluate component 500 (including mesh portion 558). In particular, the optimizer may evaluate the loads exerted on component 500 on either side "A" and "B" of the dashed circle. The optimizer may conclude that component 500 must be strong enough to bear the load of these structures.

The MCS optimizer may conclude, for example, that mesh portion 558 can be reinforced using a suitably strong COTS pipe without significant added weight or cost. As shown by arrow 645, MCS optimizer may modify mesh portion 558 to include a COTS pipe model. MCS optimizer may then modify the pipe to fit within the design space of mesh portion 558 to ultimately produce the modified structure 627. Modified structure 627 may include the cylindrical geometry of the COTS pipe design as well as a 3-D printed portion to match the geometry of the outlaying mesh. The resulting modified structure 627 is a hybrid COTS/3-D printed structure that matches the load case criteria including loads from regions A and B. In so doing, the modified structure 627 saves print material and reduces print time, because most of structure 627 includes the COTS pipe model, with some protruding material being 3-D printed and adhered to the COTS pipe via adhesive or other means.

In still other embodiments, the entire structure 625 may be 3-D printed to connect portions of the larger component 600 together. In yet other embodiments (not shown), the shape 625 may be 3-D printed and the pipe selected to reinforce the shape may have a smaller diameter to cover a smaller region within the mesh portion 558. These potentially different embodiments may be part of different proposals, provided they match the input criteria.

Referring back to FIG. 3B, at steps 324, 326 and 328, the MCS optimizer may combine sets of individually identified COTS parts and connect them with 3-D printed part models (e.g., nodes). The optimizer may run size optimization on the COTS designs and topology optimization on the node(s) that connect the COTS designs. This process may also involve further validation to ensure that the selected COTS parts and the 3-D printed parts are compatible with the load case criteria and fit within the prescribed load space. The process may further ensure that the interfaces of the part (e.g., the connectors) are correctly positioned adjacent the non-design space such that they can properly interface with connectors of a neighboring part. The scoring algorithms and the multi-objective optimizations may thereafter be important in some embodiments in determining the validity of the proposal identified in step 332. 3-D printed part and node optimization module 116 (FIG. 1B) and other components may be used to determine and generate 3-D printed loads as necessary for an MCS model.

Figure 7:
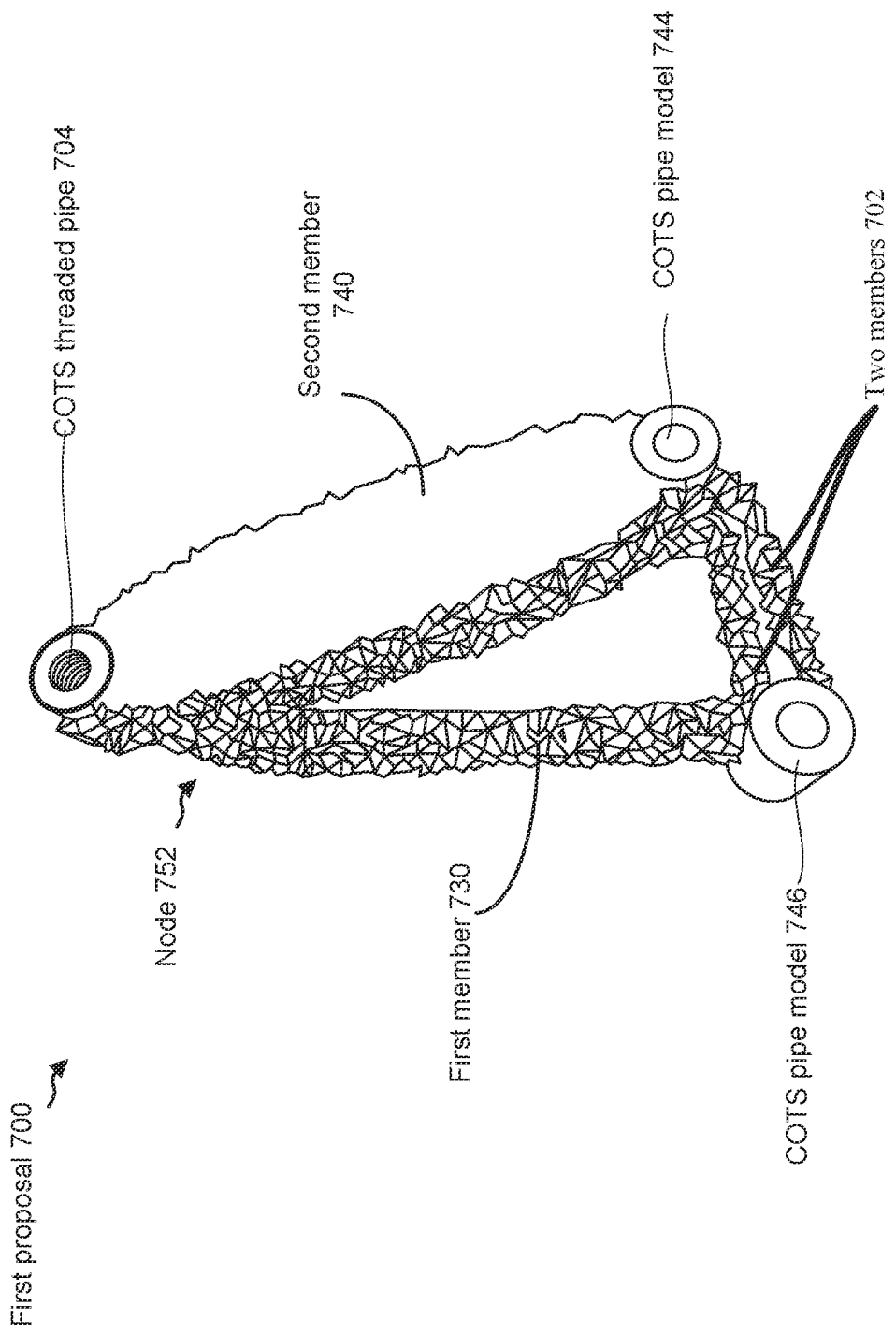
FIGS. 7-9 illustrate three exemplary proposal MCS structures to be added to a pool of candidates.
Figure 8:
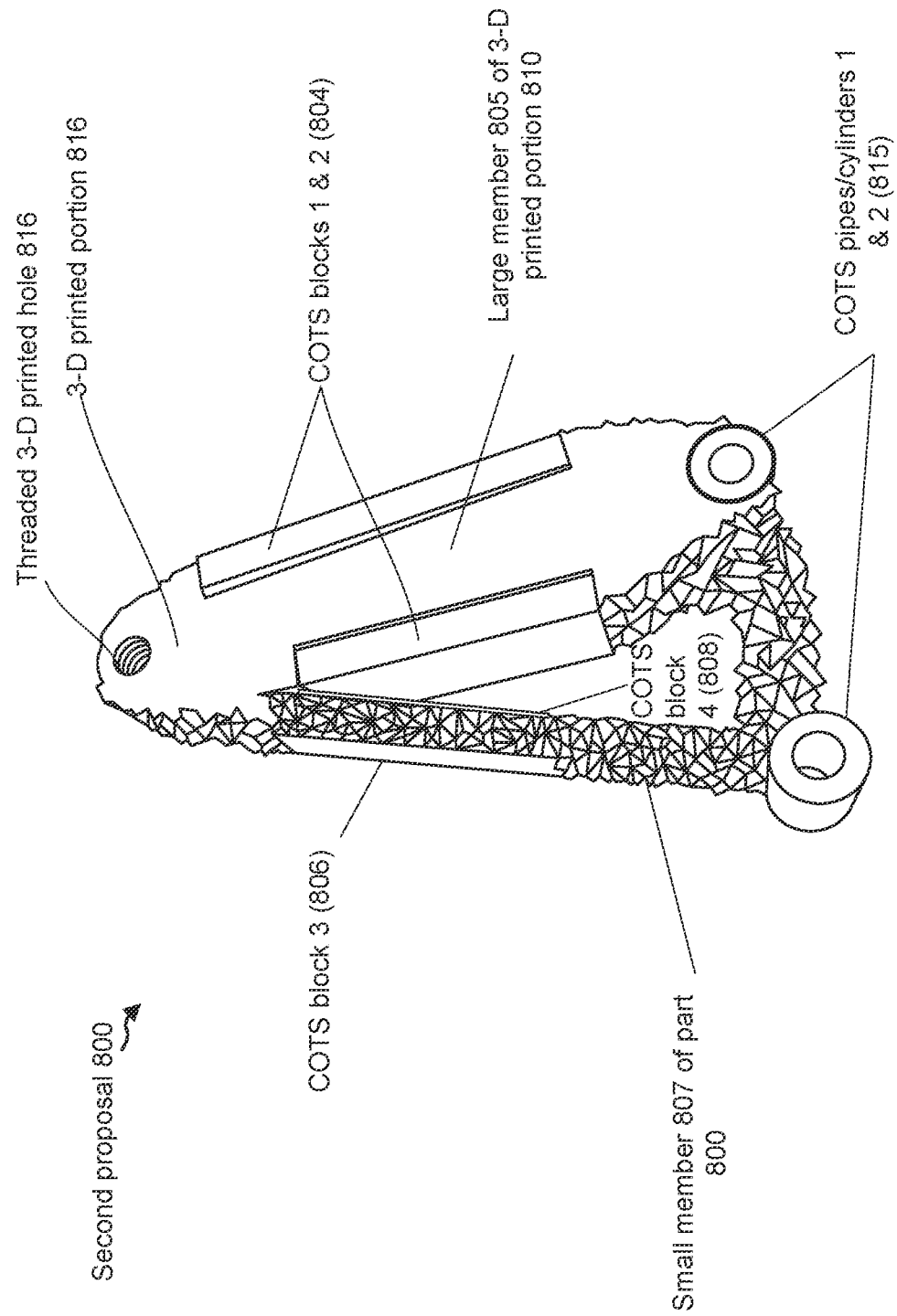
Figure 9:
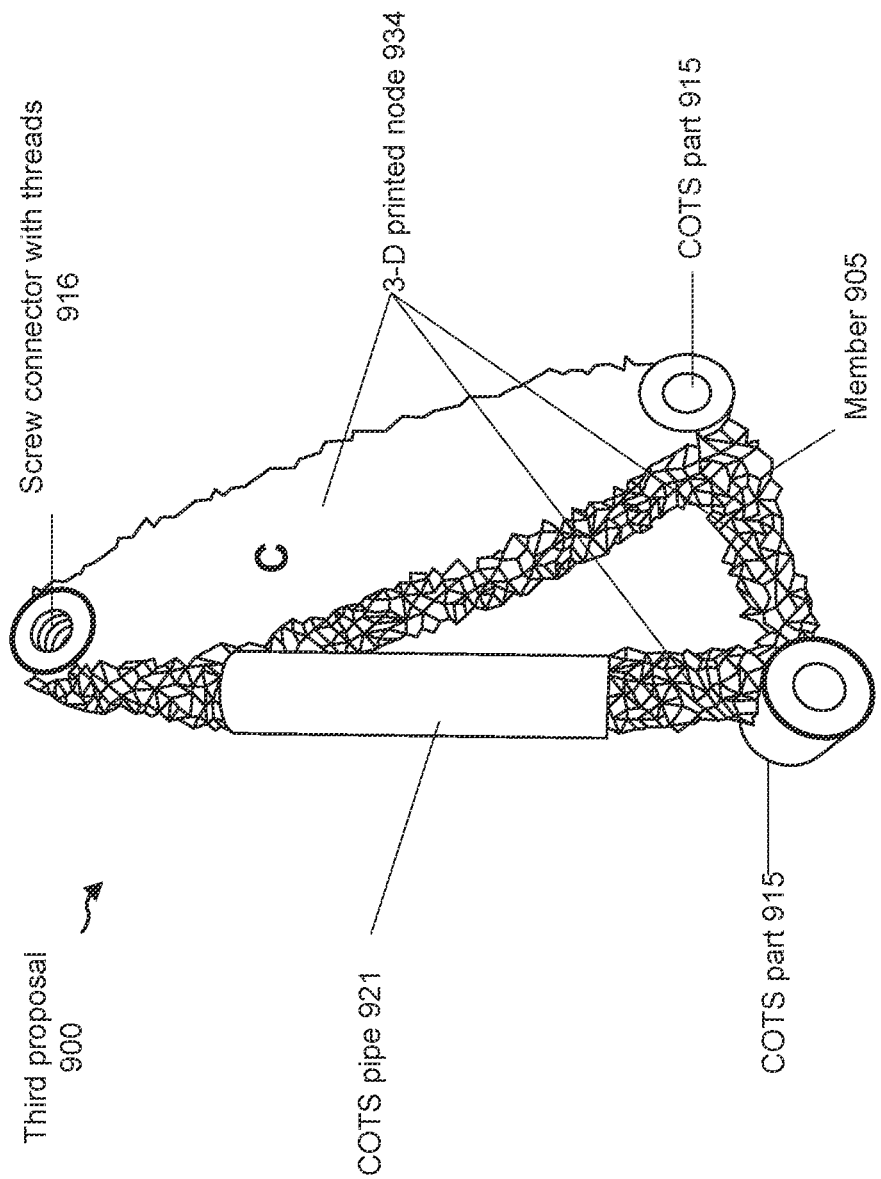

FIGS. 7-9 illustrate three exemplary proposal MCS structures to be added to a pool of candidates. FIG. 7 shows a first MCS model proposal of the part initially shown in FIG. 4. In the view of FIG. 7, the mesh portion 558 from FIG. 5 is designed to include two separate 3-D printed members 702, each of which connect first member 730 to second member 740. It may have been determined during optimization, for example, that space and material can be saved by using two smaller members 702 instead of one larger member, while still enabling the members 702 to withstand the loads on it. Further, in this exemplary optimization, first and second members 730 and 740, respectively, may be modeled as 3-D printed parts for connecting the two COTS pipe models 744 and 746 with the COTS threaded pipe 704. It is also illustrated that the 3-D printed (non-COTS) portions of the first and second members 730 and 740 both make direct contact with the two members 702. Thus the entire set of 3-D printed members may be 3-D printed in a single print job as a single node 752 that connects the three COTS parts. Advantages of the first proposal 700 include that only a single print job may be necessary, and the COTS pipes are both strong and easy to procure, and that the region 558 saves additional print material by using two smaller members. Potential drawbacks to the first proposal 700 are that there is a fairly large amount of material requiring 3-D printing. In addition to these types of observational features, each of the optimization processes will address whether the MCS model numerically meets the input load case criteria. In short, the optimization process ensures that the structure proposal (here, component 700) will still meet the original load cases and will not fall outside of the design space. If the proposal fails to adhere to the input specifications, the MMSO will consider the proposal invalid and will not add it to the structural proposal pool. Otherwise, the MMSO will add valid structural proposals to the structural proposal pool for further consideration and optimization.

FIG. 8 represents a second proposal 800 of the same part. As noted above, size optimization is conducted on the COTS parts. This ensures that the COTS parts fit within the design space. Topology optimization is also conducted on any nodes connecting specified COTS parts. Thus the various shapes of the COTS parts are taken into account, among other criteria, to generate a node that will fit within the design space and that will support the different load cases under different conditions.

The result in FIG. 8 is a second MCS module proposal that incorporates COTS pipes or cylinders 1 and 2 (815), arranged approximately orthogonal to the plane of the figure as in FIG. 7. One significant difference between the second proposal 800 and the first proposal 700 is that proposal 800, in lieu of using purely 3-D printed material to incorporate a larger node, instead conserves 3-D printing space by adding reinforcing COTS blocks 1 and 2 (804) to 3-D printed portion 816, and COTS blocks 3 and 4 (806 and 808, respectively) as coupled to the small member 807. Another reason for the COTS blocks 1-4 is that, in addition to providing a lower cost connection means no present in proposal 1, the COTS blocks may also serve to increase the load strength and provide additional support for load-bearing purposes. The proposal 800 may specify connecting the COTS blocks to the 3-D printed portion using an adhesive, for example.

Another difference between the two proposals is that proposal 700 uses a threaded COTS pipe 704, while the second proposal 800 creates a threaded hole using a 3-D printed model. In both proposals 700 and 800, the presence of the surface mesh may indicate more resolution and geometrical features at the surface. One noted advantage of proposal 2 is that potentially significant print time can be conserved by using the integrated COTS blocks 1-4. Some of that print time may, however, be consumed by the 3-D printing requirement for the threaded hole 816, as another example. The COTS blocks 1-4 also may be selected to provide a greater ability to withstand forces over time. Serving this function may make the blocks 1-4, and hence the MCS structure, heavier. Both proposals advantageously include a 3-D printed node that is connected together and that therefore can be produced in a single rendering (assuming the size of the part is not prohibitively large). One other distinction is that the two members 802 in FIG. 7 are implemented as a single member in FIG. 8.

FIG. 9 is a third proposal 900 of an MCS structure for the same part. In this proposal 800, 3-D printed node 934 remains a single node that can be printed in one rendering, as before. On difference from FIG. 8 is that the proposal 900 in FIG. 9 reverts back to the COTS threaded connector 916, eliminating the requirement that it be 3-D printed. The COTS parts 915 remain similar to proposals 700 and 800. A principle visually-apparent difference is the use of the COTS pipe 921 that encircles one portion of the 3-D printed node 924. The pipe 921 may be used to add stiffness to the 3-D printed node, or to reduce the amount of print material, or for another reason not immediately apparent from the drawings. In addition, it will also be appreciated by those skilled in the art that proposals 700, 800 and 900 are bounded by potentially large loads from regions A and B of FIG. 6. Thus, the proposals must at least be robust enough to withstand these loads for extended periods of time. Incorporating the right types of alloys and other materials may also be an important factor in generating MCS models that meet more stringent load case criteria.

The proposals from FIGS. 7-9 attempt to generate proposals for a simple MCS model to avoid unduly obscuring the disclosure. However, the proposals may be generated with respect to the entire vehicle assembly shown in FIG. 6, for example, or to substantially more complex designs with a much larger number and type of parts (e.g., panels, extrusions, and other parts).

As noted, the use of COTS components in the design space that is consistent with the load case criteria may advantageously decrease the total amount of material needed to be printed, which in turn may increase turnaround speed and reduce product cost. Thus, in various embodiments, COTS parts can be used to reduce the volume of 3-D printing necessary for remaining portions of the structure.

In the view of FIG. 9, the COTS parts have effectively been integrated with the remainder of the component 900 and the mesh representation is again shown. The model for the connecting node portion (region "C") has been flattened relative to the same region of proposal 800 so that they are even with the COTS parts. Once the MCS is complete and it is validated, it can be sent to the pool of MCS solutions (with all known solutions representing the solution space), and the remaining components (e.g., in FIG. 6) can be optimized in a similar pattern until they are complete. In various embodiments, the entire structure in FIG. 6 is optimized at once, potentially using more comprehensive load case criteria that take into account, for example, interconnections among other parts of the vehicle, the loads that the vehicle's adjacent parts will exert on the modeled MCS structure when the vehicle is in operation in potentially adverse conditions (e.g., bumpy or snow-covered roads, etc.), the need for materials that last over time and diverse climates, and other input criteria.

Referring back to FIG. 3B, at step 330, the MCS optimizer may use one or more different algorithms to explore the solution space (the pool of proposals that meet the load case criteria and any other input requirements). Each proposal is evaluated in light of the objective functions and constraints to achieve multi-objective optimization over the other proposals in the pool. Based on the evaluation of the candidate structures, at step 332, the MCS optimizer may produce a set of proposals along the pareto frontier together with a display of the evaluation metrics. The proposed MCSs that lie along a pareto frontier means that no change to a solution can be made without worsening another factor in that solution. Applied to the engineering problems here, it may be desirable to find a solution that lies along the pareto frontier because if the proposals did not lie along the pareto frontier, that means an improvement can be made to the solution without making any other aspect of the solution worse. This in turn means that the proposal is not optimized.

The proposals 700, 800 and 900 only show illustrations from one view, and fail to include numerical values, materials used, and other physical properties of the MCS model that enable a user to compare the characteristics of the model with the input criteria and otherwise evaluate the model. In various embodiments, each proposal (e.g., distinct MCS model solution) may include the following information:

1. List(s) of COTS specifications
2. CAD (3-D printed) or equivalent model for 3-D printed structures
3. Joint specification for 3-D printed parts and COTS (e.g., a joint geometry definition, identity of adhesive if used, expected adhesive material properties, use of mechanical fasteners, or any other relevant specifications)
4. An assembly sequence. If an adopted proposal is to be assembled in an automated fashion (e.g., using a controller and one or more robotic devices), the order and type of operations may be defined and the robotic devices may be identified (using vernacular specific to the hardware devices that will be performing the assembly).
5. Evaluation metrics against the design requirements. Evaluation metrics can include any necessary attribute to test the viability of the proposal. The correct metrics may correlate with the most ideal solution. Historically, accuracy, precision, and recall have been deemed some of the most central metrics. However, the most useful evaluation metrics will likely depend on the test configuration. Other exemplary metrics include the stress on a part given a particular load, stress versus strain information, predicted material degradation timelines, material rigidity and crack tendencies, type of alloys used, and the like.
6. Performance metrics of the MCS models.

In some instances, more than one obvious possible solution may exist. In this case it may be incumbent on the user/manufacturer to select the proposal of choice. In other cases, however, significant physical/material/performance differences can be elicited from the set of proposals, and the few (or one) most ideal proposal will be evident from the scoring, validation, and size and topology optimizations.

Figure 10:
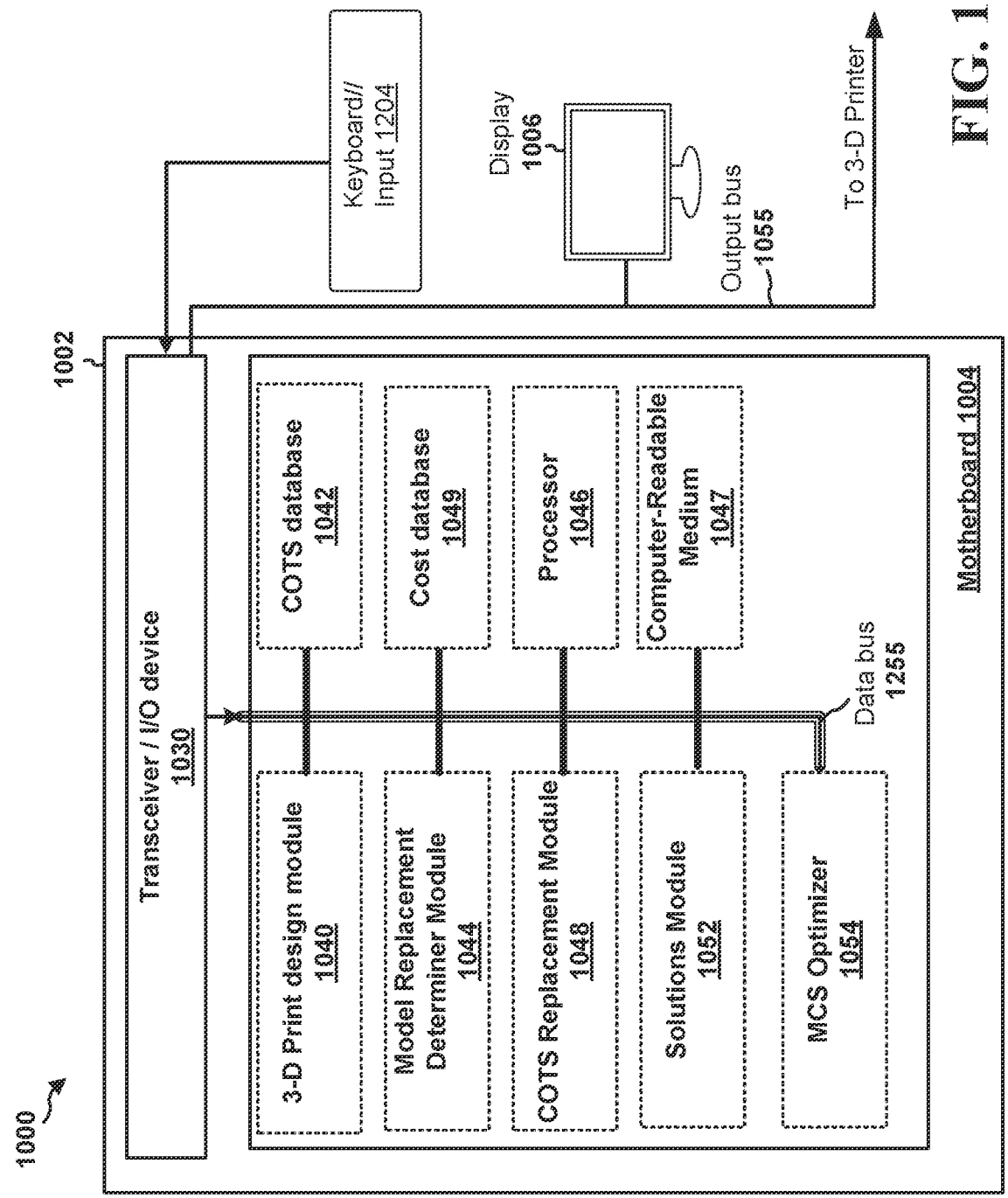
FIG. 10 is an example of an apparatus in which the MCS model optimization may be performed.

FIG. 10 is an example of an apparatus 1000 in which the MCS model optimization may be performed. For example, the apparatus 1000 may be used to perform the steps of FIGS. 3A and 3B. The apparatus 1000 may, for example, be a workstation, a server, a network of workstations/servers, a PC, or another type of computing device. In some embodiments, as shown by output bus 1055 (which may be coupled to one or more displays 1006 or other peripheral devices, printers, etc.), the apparatus 1000 can be connected to a 3-D printer to compile and transmit print jobs directly to the 3-D printer of choice. A keyboard 1004 and/or other input device are coupled to a transceiver/I/O device 1030 of the apparatus 1000. The apparatus 1000 may in some embodiments include a main motherboard 1004, although other configurations are possible. Apparatus 1000 further includes at least one processor or CPU 1046, and at least one computer-readable medium or memory 1047.

The computer-readable medium 1047 may include one or more of random access memory (e.g., DRAM), cache memory (which may also reside in processor 1046), read only memory and its various alternatives (EPROM, EEPROM, PROM, etc.), static RAM, magnetic drives, solid state drives, and the like. In addition to holding instructions executable by a computer to perform the functions in FIGS. 3A, 3B and the functions identified by the modules in FIGS. 1A and 1B, the computer-readable medium 1047 may include one or more databases relevant to the MCS model operations. In some embodiments, apparatus 1000 may include a cost database that may be periodically updateable and that may include product purchase information, assembly cost information, cost in man-hours and other indicia, lifecycle costs, product failure costs, etc. Apparatus 1000 may also include an updateable COTS parts database, which may be used to store a wide variety of types, shapes and sizes of COTS parts, including their detailed specifications, operating information, and prices (which may in some embodiments be stored in the cost database 1049).

Apparatus 1000 may also include different special purpose processors, special purpose computers, or special purpose hardware modules configured to perform the functions identified in FIGS. 1-3. As noted above, these modules may represent code executable on processor 1046, or they may represent one or more special purpose processors or hardware modules such as programmable array logic, field programmable gate arrays, digital signal processors, etc.

Apparatus 1000 includes a 3-D print design module 1040. 3-D print design module 1040 is configured to receive input from the transceiver/I/O device 1030 or internally from various components over data bus 1055 which connects all identified components on the motherboard 1004. The input may be in the form of load case criteria, boundaries, and input design requirements (e.g., model replacement determiner module 1044, processor 1046, computer-readable medium 1047, COTS replacement module 1048, etc.) as described above in FIGS. 1A and 1B and the accompanying text. 3-D print design module 1040 may be configured to use these input requirements in concert with information from the respective databases and memory to obtaining a 3-D print model of an object, wherein the 3-D print model is based on load case criteria. 3-D print design module 1040 may be configured to determine a 3-D print model using processing techniques. Module 1040 may be configured to determine one or more CAD models of a 3-D printed object. 3-D print design module 1040 may generate a 3-D printed object of all or part of the design space and the non-design space. 3-D print design module 1040 may generate the 3-D printed module automatedly or with user input.

3-D print design module 1040 may be further configured to perform initial topological optimizations and mesh segmentations to generate structures representing a load path. 3-D print design module 1040 may also perform node analysis and may generate models of one or more 3-D printed nodes for use in joining together COTS parts.

Apparatus 1000 may further include model replacement determiner module 1044. Model replacement determiner module 1044 may receive input from transceiver/I/O device and other modules as described above with respect to module 1040. Model replacement determiner module 1044 may perform metrics evaluation techniques for evaluating criteria against various metrics as described herein. Model replacement determiner module 1044 may further perform mesh segmentation on the MCS structure model. Model replacement determiner module 1044 may also evaluate proposed replacements and place proposed replacements along a pareto frontier. Model replacement determiner module 1044 may further perform size and topology optimizations on COTS and 3-D printed parts.

Apparatus 1000 may further include COTS replacement module 1048. COTS replacement module 1048 may be configured to interface with other modules as described above. COTS replacement module 1048 may be configured to replace portions of the MCS module with COTS parts. COTS replacement module 1048 may further be configured to perform comparison of input and design criteria, and load case criteria, against actual simulated values. COTS replacement module 1048 may also be configured to evaluate multiple proposed solutions of MCS models across multiple objective solutions. In some embodiments, COTS replacement module 1048 may further be configured to identify an ideal MCS solution based on criteria that most closely match the load case criteria and input design requirements. COTS replacement module 1048 may also be configured to perform various validation and scoring algorithms to assist it in correctly identifying the COTS parts associated with devices.

Apparatus 1000 further includes solutions module 1052. In some embodiments, solutions module 1052 may further be configured to identify an ideal MCS solution based on criteria that most closely match the load case criteria and input design requirements.

MCS optimizer 1054 may be configured to perform optimizations of all MCS proposals using the input criteria to generate a valid set of MCSs across the solution space. MCS optimizer 1054 may also receive input from users via transceiver/I/O device as well as input requirements and part determination information from 3-D print design module 1040, model replacement determiner module 1044 and solutions module 1052.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method for determining a multi-component structure (MCS) model, comprising:
   obtaining a 3-D print model of an object, wherein the 3-D print model is based on load case criteria;
   determining a portion of the 3-D print model that can be replaced with a commercial-off-the-shelf (COTS) part model, such that the load case criteria remain satisfied; and
   replacing the portion with the COTS part model to determine the MCS model,
   wherein replacing the portion with the COTS part model includes performing multi-objective analysis based on a plurality of objective functions, and
   wherein the objective functions comprise at least evaluating structural performance or a number of joints.

2. The method of claim 1, wherein determining the portion of the 3-D print model that can be replaced by the COTS model includes evaluating a plurality of evaluation metrics against a plurality of design requirements.

3. The method of claim 2, wherein the evaluation metrics include at least a structural performance factor, a 3-D print cost, a COTS part cost, an assembly cost, or a lifecycle cost.

4. The method of claim 1, wherein obtaining the 3-D print model includes determining the 3-D print model based on the load case criteria.

5. The method of claim 4, wherein determining the 3-D print model is further based on at least a design space, a non-design space including a hard point or connection, a size, shape, density, material and weight requirement, an ecological and environmental consideration, a COTS count requirement, and a parts, assembly, and lifecycle cost.

6. The method of claim 4, wherein determining the 3-D print model includes performing topology optimization to identify a load path based on the load case criteria.

7. The method of claim 6, wherein determining the 3-D print model is further based on a non-design space, the non-design space including a hard point or a connection.

8. The method of claim 4, wherein determining the 3-D print model includes performing mesh segmentation to generate a mesh representation of the object based at least in part on the load case criteria, the generated mesh representation including a surface mesh.

9. The method of claim 8, wherein determining the portion of the 3-D print model that can be replaced by the COTS model includes analyzing the mesh representation to match the COTS part model with a geometry of a portion of the mesh representation.

10. The method of claim 1, wherein replacing the portion with the COTS part model includes determining a plurality of different potential replacements, each potential replacement including a potential portion of the 3-D print model and a potential COTS part model, wherein at least the potential portion or the potential COTS part model is different with different potential replacements.

11. The method of claim 10, wherein replacing the portion with the COTS part model includes comparing the potential replacements based on one or more input criteria.

12. The method of claim 11, wherein comparing the potential replacements includes determining where each potential replacement lies along a pareto frontier.

13. The method of claim 11, wherein comparing the potential replacements includes performing size optimization on the potential COTS part model of one of the potential replacements or performing topology optimization on the potential portion of the 3-D printed part of one of the potential replacements.

14. The method of claim 1, wherein the COTS part model includes at least a plate, a tube, a pipe, a fastener, or an extrusion.

15. The method of claim 1, wherein the MCS model includes a plurality of different materials.

16. The method of claim 1, wherein the 3-D print model includes a node model.

17. A non-transitory computer readable medium having code stored therein for determining a multi-component structure (MCS) model, wherein the code when executed by at least one processor causes the at least one processor to:
   obtain a 3-D print model of an object, wherein the 3-D print model is based on load case criteria;
   determine a portion of the 3-D print model that can be replaced with a commercial-off-the-shelf (COTS) part model, such that the load case criteria remain satisfied; and
   replace the portion with the COTS part model to determine the MCS model,
   wherein replacing the portion with the COTS part model includes performing multi-objective analysis based on a plurality of objective functions, and
   wherein the objective functions comprise at least evaluating structural performance or a number of joints.

18. The computer readable medium of claim 17, wherein determining the portion of the 3-D print model that can be replaced by the COTS model includes evaluating a plurality of evaluation metrics against a plurality of design requirements.

19. The computer readable medium of claim 18, wherein the evaluation metrics include at least a structural performance factor, a 3-D print cost, a COTS part cost, an assembly cost, or a lifecycle cost.

20. The computer readable medium of claim 17, wherein obtaining the 3-D print model includes determining the 3-D print model based on the load case criteria.

21. The computer readable medium of claim 20, wherein the 3-D print model is further based on at least a design space, a non-design space including a hard point or connection, a size, shape, density, material and weight requirement, an ecological and environmental consideration, a COTS count requirement, and a parts, assembly, and lifecycle cost.

22. The computer readable medium of claim 20, wherein determining the 3-D print model includes performing topology optimization to identify a load path based on the load case criteria.

23. The computer readable medium of claim 22, wherein determining the 3-D print model is further based on a non-design space, the non-design space including a hard point or a connection.

24. The computer readable medium of claim 20, wherein determining the 3-D print model includes performing mesh segmentation to generate a mesh representation of the object based at least in part on the load case criteria, the generated mesh representation including a surface mesh.

25. The computer readable medium of claim 24, wherein determining the portion of the 3-D print model that can be replaced by the COTS model includes analyzing the mesh representation to match the COTS part model with a geometry of a portion of the mesh representation.

26. The computer readable medium of claim 17, wherein replacing the portion with the COTS part model includes determining a plurality of different potential replacements, each potential replacement including a potential portion of the 3-D print model and a potential COTS part model, wherein at least the potential portion or the potential COTS part model is different with different potential replacements.

27. The computer readable medium of claim 26, wherein replacing the portion with the COTS part model includes comparing the potential replacements based on one or more input criteria.

28. The computer readable medium of claim 27, wherein comparing the potential replacements includes determining where each potential replacement lies along a pareto frontier.

29. The computer readable medium of claim 27, wherein comparing the potential replacements includes performing size optimization on the potential COTS part model of one of the potential replacements or performing topology optimization on the potential portion of the 3-D printed part of one of the potential replacements.

30. The computer readable medium of claim 17, wherein the COTS part model includes at least a plate, a tube, a pipe, a fastener, or an extrusion.

31. The computer readable medium of claim 17, wherein the MCS model includes a plurality of different materials.

32. The computer readable medium of claim 17, wherein the 3-D print model includes a node model.

33. An apparatus for determining a multi-component structure (MCS) model, the apparatus comprising:
   a three-dimensional (3-D) print model module configured to obtain a 3-D print model of an object, wherein the 3-D print model is based on load case criteria;
   a model replacement determiner module configured to determine a portion of the 3-D print model that can be replaced with a commercial-off-the-shelf (COTS) part model, such that the load case criteria remain satisfied; and
   a COTS replacement module configured to replace the portion with the COTS part model to determine the MCS model,
   wherein replacing the portion with the COTS part model includes performing multi-objective analysis based on a plurality of objective functions, and
   wherein the objective functions comprise at least evaluating structural performance or a number of joints.

34. The apparatus of claim 33, wherein the 3-D print model module is configured to determine the 3-D print model based on user input.

* * * * *